US012614140B2

(12) United States Patent
Nerurkar et al.

(10) Patent No.: US 12,614,140 B2
(45) Date of Patent: Apr. 28, 2026

(54) TECHNOLOGY CURRENCY MEASUREMENT AND MONITORING SYSTEM AND METHOD

(71) Applicant: Hartford Fire Insurance Company, Hartford, CT (US)

(72) Inventors: Rajesh Kamlakar Nerurkar, Charlotte, NC (US); Darin Wayne McCormick, Glastonbury, CT (US); Anne M. Goulet, Manchester, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 158 days.

(21) Appl. No.: 18/244,509

(22) Filed: Sep. 11, 2023

(65) Prior Publication Data

US 2025/0086555 A1     Mar. 13, 2025

(51) Int. Cl.
*G06Q 10/00* (2023.01)
*G06Q 10/0635* (2023.01)
*G06Q 10/0637* (2023.01)

(52) U.S. Cl.
CPC ..... *G06Q 10/0637* (2013.01); *G06Q 10/0635* (2013.01)

(58) Field of Classification Search
None
See application file for complete search history.

(56) References Cited

U.S. PATENT DOCUMENTS

| | | | | |
|---|---|---|---|---|
| 7,058,197 B1* | 6/2006 | McGuire | .................. | G06T 7/11 |
| | | | | 382/108 |
| 7,672,921 B1* | 3/2010 | Clay | ..................... | G06Q 10/06 |
| | | | | 706/45 |
| 11,157,857 B2 | 10/2021 | Gantait | | |
| 11,467,828 B1* | 10/2022 | Zhang | ....................... | G06N 5/04 |
| 2006/0195562 A1* | 8/2006 | Eisenson | ............. | G06Q 10/087 |
| | | | | 709/223 |
| 2009/0299804 A1* | 12/2009 | Owens | ................... | G06Q 10/06 |
| | | | | 706/52 |
| 2010/0057520 A1 | 3/2010 | Rejai | | |
| 2011/0066570 A1 | 3/2011 | Kolo et al. | | |
| 2011/0313949 A1* | 12/2011 | Bishop | .................. | G06Q 40/04 |
| | | | | 705/36 R |
| 2011/0314449 A1 | 12/2011 | Babu et al. | | |

(Continued)

OTHER PUBLICATIONS

SA Slaughter (Aligning Software Processes with Strategy) 2006-jstor https://www.jstor.org (Year: 2006).*

(Continued)

*Primary Examiner* — Hafiz A Kassim
(74) *Attorney, Agent, or Firm* — Howard IP Law Group, PC

(57) ABSTRACT

A system and method for technology currency monitoring of components in a computer system includes receiving data indicative of a value for each of a plurality of technology debt attributes and at least one strategic criticality attribute for each of the components; responsive to receipt of the values, calculating a technology currency score for each of the components based on (1) a sum of the values of each of the plurality of technology debt attributes, and (2) a sum of the values of the at least one strategic criticality attribute; and transmitting the calculated technology currency score for each of the components to one or more user devices.

13 Claims, 13 Drawing Sheets

(56) References Cited

U.S. PATENT DOCUMENTS

| | | | |
|---|---|---|---|
| 2012/0059683 A1* | 3/2012 | Opalach ............. | G06Q 10/0633 |
| | | | 705/7.27 |
| 2012/0271740 A1* | 10/2012 | Connors .......... | G06Q 10/06315 |
| | | | 705/28 |
| 2018/0322434 A1* | 11/2018 | Bodman ............ | G06Q 10/0637 |
| 2019/0266539 A1 | 8/2019 | Gantait | |
| 2021/0109843 A1* | 4/2021 | Datta ........................ | G06F 9/54 |
| 2023/0410213 A1* | 12/2023 | Sankarakuthalam ........................ | |
| | | | G06Q 10/0635 |

OTHER PUBLICATIONS

F Bachmann, L Bass, J Carriere, PC Clements et al. (Software architecture documentation in practice: Documenting architectural layers)—2000—getforms.org (Year: 2000).*
KJ Liapis, DD Kantianis (Depreciation methods and life-cycle costing (LCC) methodology)—Procedia Economics and Finance, 2015—Elsevier (Year: 2015).*

* cited by examiner

| Component ID | Supportability | Remaining Life Span | Stability | Span | Business Criticality | Strategic Alignment | Component Score | Assessment |
|---|---|---|---|---|---|---|---|---|
| 11501 | 5 | 5 | 5 | 9 | 9 | 9 | 0.66 | Concerning |
| 11502 | 9 | 9 | 5 | 5 | 9 | 9 | 0.78 | Critical |
| 11503 | 9 | 9 | 9 | 9 | 9 | 9 | 1.00 | Critical |
| 11504 | 1 | 9 | 9 | 9 | 9 | 9 | 0.78 | Critical |
| 11505 | 1 | 9 | 9 | 9 | 5 | 9 | 0.60 | Concerning |
| 11506 | 1 | 9 | 9 | 9 | 1 | 9 | 0.43 | Concerning |
| 11507 | 1 | 1 | 1 | 9 | 9 | 9 | 0.58 | Concerning |
| 11508 | 1 | 1 | 1 | 9 | 9 | 9 | 0.33 | Acceptable |
| 11509 | 1 | 1 | 1 | 1 | 9 | 9 | 0.10 | Acceptable |
| 11510 | 1 | 1 | 1 | 1 | 1 | 1 | 0.0 | Acceptable |

| Component ID | Supportability | Remaining Life Span | Stability | Span | Business Criticality | Strategic Alignment | Component Score | Assessment |
|---|---|---|---|---|---|---|---|---|
| 11001 | 3 | 3 | 3 | 9 | 9 | 9 | 4.94 | Critical |
| 11002 | 9 | 9 | 3 | 3 | 9 | 9 | 6.63 | Concerning |
| 13501 | 9 | 9 | 9 | 9 | 9 | 9 | 10.00 | Acceptable |
| 13502 | 1 | 9 | 9 | 9 | 9 | 9 | 7.75 | Acceptable |
| 13503 | 1 | 9 | 1 | 9 | 9 | 9 | 5.5 | Concerning |
| 13504 | 1 | 1 | 1 | 9 | 9 | 9 | 3.25 | Critical |

| Application ID | Component ID | Component Score | Application Score | Application Assessment |
|---|---|---|---|---|
| 31050 | 11501 | 0.66 | 0.76 | Critical |
|  | 11502 | 0.78 |  |  |
|  | 11503 | 1.00 |  |  |
|  | 11504 | 0.78 |  |  |
|  | 11505 | 0.60 |  |  |
| 31051 | 11506 | 0.43 | 0.29 | Acceptable |
|  | 11507 | 0.58 |  |  |
|  | 11508 | 0.33 |  |  |
|  | 11509 | 0.10 |  |  |
|  | 11510 | 0.0 |  |  |

380

390

382    384    386    388

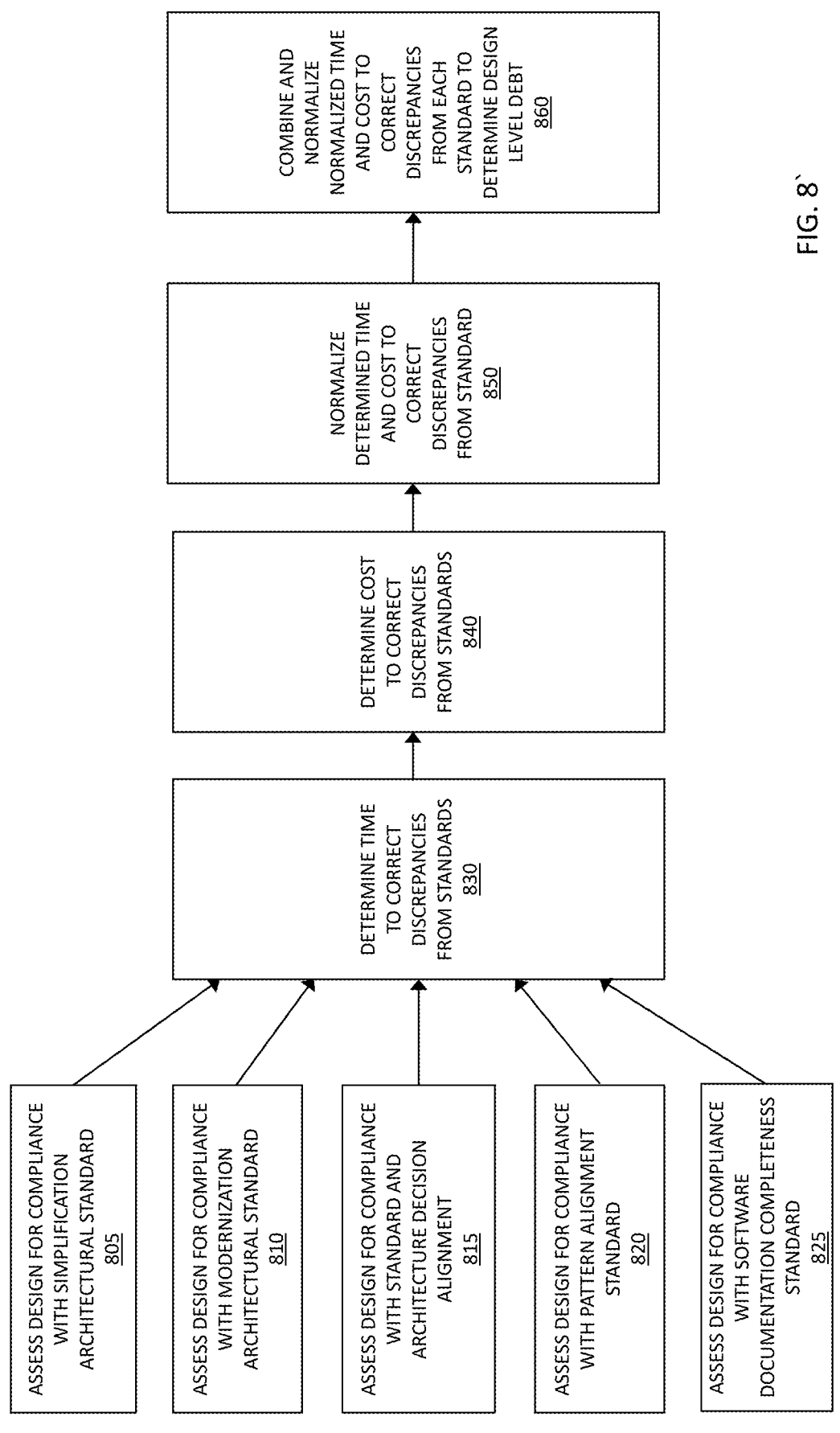

ASSESS DESIGN FOR COMPLIANCE WITH SIMPLIFICATION ARCHITECTURAL STANDARD 805

ASSESS DESIGN FOR COMPLIANCE WITH MODERNIZATION ARCHITECTURAL STANDARD 810

ASSESS DESIGN FOR COMPLIANCE WITH STANDARD AND ARCHITECTURE DECISION ALIGNMENT 815

ASSESS DESIGN FOR COMPLIANCE WITH PATTERN ALIGNMENT STANDARD 820

ASSESS DESIGN FOR COMPLIANCE WITH SOFTWARE DOCUMENTATION COMPLETENESS STANDARD 825

DETERMINE TIME TO CORRECT DISCREPANCIES FROM STANDARDS 830

DETERMINE COST TO CORRECT DISCREPANCIES FROM STANDARDS 840

NORMALIZE DETERMINED TIME AND COST TO CORRECT DISCREPANCIES FROM STANDARD 850

COMBINE AND NORMALIZE NORMALIZED TIME AND COST TO CORRECT DISCREPANCIES FROM EACH STANDARD TO DETERMINE DESIGN LEVEL DEBT 860

FIG. 8

TECHNOLOGY CURRENCY MEASUREMENT AND MONITORING SYSTEM AND METHOD

CROSS-REFERENCE TO RELATED APPLICATIONS

None

BACKGROUND

The assessment of technological currency is an important task for management of entity computer systems. Technological currency relates to various types of technological components of entity computer systems, including both software and hardware components. Technological currency for a technological component may include a number of different characteristics of a technological component. Those characteristics may include the stability of the component, or the frequency of failures of the component to perform in accordance with specifications of the component. Another characteristic may be the expected remaining life of a component, which may be the time until a future date when support for the component by a manufacturer or other third party is scheduled to cease. Another characteristic of a technological component may be supportability, which may be stated as the ability of an entity's own technical support personnel or other vendors to effectively maintain the technology, including, for example, effectiveness in identifying and fixing software bugs.

For entities, the computer systems of the entity may include hundreds of software and hardware components. The assessment of technological currency of all of those components, for purposes such as prioritizing which components to take offline, continue to support, is important. By way of example, inaccurate assessments of technological currency may result in delays or failures to update or replace components lacking in stability, and may result in detrimental effects on computer systems, including effects such as delays in processing, inefficiencies in processing, and failures in processing.

Present technological solutions for accurate assessment of technological currency are lacking in accuracy, efficiency and ease of use. Accordingly, new technological solutions that provide assessment of technological currency for computer systems having large numbers of technological components, in a manner that is accurate, efficient, and provides for ease of use.

SUMMARY

Embodiments address the foregoing disadvantages of the prior art, as well as providing additional advantages, via a computerized system. In embodiments, the computerized system for technology currency assessment of components and applications of one or more computer systems includes one or more computer processors; one or more non-transitory computer memories, the computer memories storing computer-readable instructions, which instructions, when executed by the one or more computer processors, cause the one or more computer processors to receive data indicative of a value for each of a plurality of technology debt attributes and at least one strategic criticality attribute for each of the components; responsive to receipt of the values, calculate a technology currency score for each of the components based on (1) a sum of the values of each of the plurality of technology debt attributes, and (2) a sum of the values of the at least one strategic criticality attribute; and transmit the calculated technology currency score for each of the components to one or more user devices.

In embodiments, a computerized method for providing technology currency monitoring of components for a computer system includes, by one or more computer processors, receiving data indicative of a value for each of a plurality of technology debt attributes and at least one strategic criticality attribute for each of the components; responsive to receipt of the values, calculating a technology currency score for each of the components based on (1) a sum of the values of each of the plurality of technology debt attributes, and (2) a sum of the values of the at least one strategic criticality attribute; and transmitting the calculated technology currency score for each of the components to one or more user devices.

In embodiments, a non-transitory computer-readable storage medium stores instructions adapted to be executed by one or more computer processors to perform a method associated with providing technology currency monitoring for components of a computer system, the method including receiving data indicative of a value for each of a plurality of technology debt attributes and at least one strategic criticality attribute for each of the components; responsive to receipt of the values, calculating a technology currency score for each of the components based on (1) a sum of the values of each of the plurality of technology debt attributes, and (2) a sum of the values of the at least one strategic criticality attribute; and transmitting the calculated technology currency score for each of the components to one or more user devices.

BRIEF DESCRIPTION OF THE DRAWINGS

A more detailed understanding may be had from the following description, given by way of example in conjunction with the accompanying drawings wherein:

FIG. 3A shows an exemplary table of data relating to technology currency for computer system components in an illustrative embodiment of the present invention;

FIG. 3B shows an exemplary table of data relating to technology currency for computer system components in an alternative illustrative embodiment of the present invention;

FIG. 8 shows an exemplary data flow in an illustrative embodiment of the present invention in which a design level technology debt score of an application is determined.

3

Figure 9:
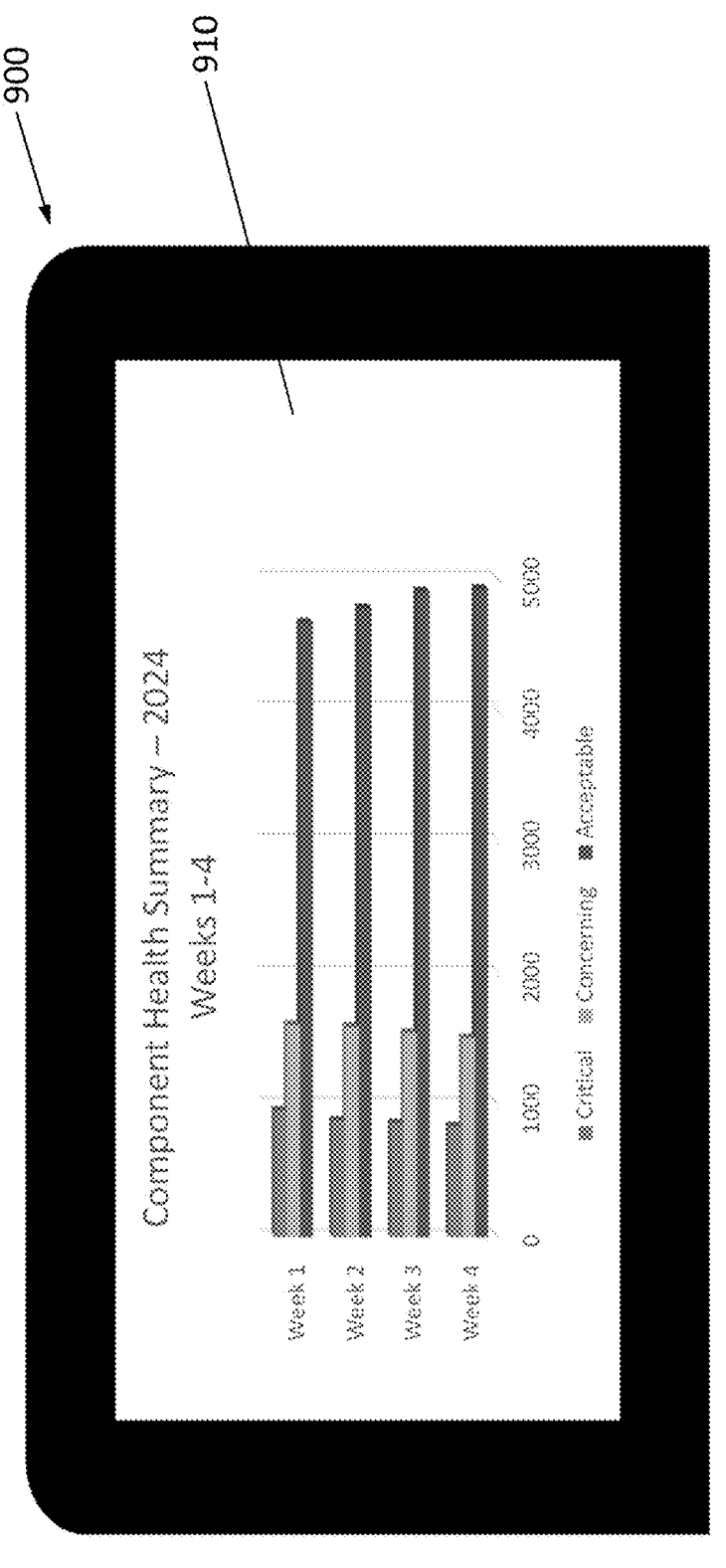

FIG. 9 shows an exemplary user device displaying a dashboard application display of component technology currency data in an illustrative embodiment of the present invention.

DETAILED DESCRIPTION

Disclosed herein are processor-executable methods, software tools, computing systems, and related technologies for the measurement, quantification and determination of technological currency of components and applications of computer systems. The disclosed methods, tools, systems and related technologies may also be said to determine the technology debt of components and applications, where the technology debt is indicative of a lack of technological currency. The accurate assessment of technological currency of components of computer systems is important in assuring that computer systems avoid delays, inefficiencies, processing errors, and failures.

The term "component" may include in embodiments any element of software or hardware of a computer system or network of an entity. In embodiments, the term "component" may include software modules that are independently executable. Components may include code that is usable in more than one application. Examples of software components may include views, models, controllers, data access objects, services, plugins, and APIs. In embodiments, the term "component" may include any element of hardware used within a system or network.

An entity computer system may include hundreds of thousands or millions of components. As a result of the large numbers of components, it is not feasible to manually assess and rate the urgency of updating or replacing these large numbers of components in a reasonable time.

In certain embodiments, a technological currency monitoring computer system in communication with an entity computer system may receive data indicative of a value for each of a plurality of technology debt attributes and at least one strategic criticality attribute for each of the components. Responsive to receipt of the values, the technological currency monitoring computer system may calculate a technological currency score for each of the components based on (1) a sum of the values of each of the plurality of technology debt attributes, and (2) a sum of the values of the at least one strategic criticality attribute. The technological currency monitoring computer system may, for each of the plurality of applications of the entity system, determine, based on the calculated technological currency scores for each of the components associated with the application, a score for the application.

The technological currency monitoring computer system may store the resulting scores, and periodically re-assess the resulting application scores. Monitoring dashboard and alerting capabilities may alert users to technological currency scores for components and related application scores that are beyond acceptable thresholds for scores at a given time or are within an acceptable range but are experiencing rates of change toward a threshold where the rate of change is beyond an acceptable threshold for a rate of change.

The present invention provides for an algorithmic approach that enables computers to accurately assess the combined technology debt and importance to an overall system of components. The algorithmic approach quantifies the technology debt, or deficiencies in technology currency, of components and applications in a computer system. Quantification enables computer-implemented identification and ranking of components and applications experiencing technology debt and requiring action, as well as enabling automatic responses. The approach further quantifies the importance of technology debt of components via the quantified strategic criticality attributes, further allowing computer-implemented assessment of components and applications most requiring attention and action. The algorithmic approach allows for computers to determine the technology debt of large numbers of components in a system, which determination could not previously practically be performed in a reasonable amount of time. In addition, while manual assessments of individual components may have been performed in the past relying on the judgment of information technology professionals, the present algorithmic approach makes it possible for computers to make those assessments.

The technology debt attributes may include one or more of (1) supportability, (2) expected remaining life span, (3) stability and (4) span. Each of these technology debt attributes may be determined for each component on a normalized scale.

Supportability is a measure of the ability of entity personnel or third parties to provide support for the component, including such factors as ability to monitor performance of the component, identify exceptions or faults of the component, debug or isolate exception or faults to determine causes, and provide maintenance, such as replacement parts, debugging, code updates and other software maintenance. Expected remaining life span of a component is a measure of a time remaining for anticipated support provided by a supplier or manufacturer. The expected remaining life span of a component may be a published remaining time for support to be provided generally for a component, such as off-the-shelf software supported by a manufacturer, or remaining term of a support contract provided by a supplier. Stability is a measure of the ability of a component to maintain normal processing over time periods and under a variety of different demands, and may be measured based on such factors as duration between detected exceptions or faults. Span is a measure of the extent to which a component is implemented within an entity computer system, or the footprint of the component within the entity computer system.

The strategic criticality attributes may include one or more attributes that measure values of the component as related to strategic goals of the entity. Two strategic criticality attributes are business criticality and alignment with strategic technology roadmap. The attribute business criticality measures the importance of the component to the business goals of the business. For example, a component that performs essential steps to processing customer requests in real time will have a business criticality score indicative of a high level of business criticality. A component that performs only operations relating to internal operations that have low time sensitivity would have a business criticality score indicative of low business criticality. The attribute alignment with strategic technology road map measures the extent to which the component serves important goals set forth in a strategic technology road map of the entity. A low value of strategic criticality attributes indicates that operation of a component having technology debt, without action such as enhanced monitoring, updating, or replacement, has a lower risk to operations of a computer network, in contrast to a component having a higher value of strategic criticality attributes and a same level of technology debt.

In embodiments, a technology currency monitoring tool may perform steps to maintain and update an inventory of components, and monitoring steps to obtain data from and information regarding components of an entity computer system. Maintaining and updating an inventory may include on a periodic or aperiodic basis performing scans, using a suitable discovery tool, for example, of the system to identify components, determining whether identified components are already in a system inventory of components, and adding to the system inventory any identified components not already in the system inventory. Monitoring steps may include obtaining data from entity computer system components relating to technological currency. Such monitoring steps may include querying data elements reflecting data such as component version, most recent update date, dates of expiration of components or dates of expiration of support of components, and other data elements. The technological currency monitoring tool may be programmed to perform the monitoring on a periodic or aperiodic basis. The technological currency monitoring tool may be programmed to perform the monitoring on a periodic basis that depends on one or more attributes of components. For example, monitoring may be performed more frequently, as compared to a standard or default frequency, for a component responsive to a determination that the technology currency score of the component is beyond a threshold. More frequent monitoring changes the operation of a computer network, such as by increasing the frequency of messages between a device running a technology currency tool and other devices on the computer network.

Responsive to determining that the technology currency score of a component or of an application is beyond a threshold, the technology currency tool may select an automatic response. The selected automatic response may include monitoring of components of the application more frequently, as compared to a default or normal frequency; notification of an account associated with an owner or individual assigned to have oversight for the component or application; or automatically triggering a deployment pipeline to replace the component or application with an updated version of the same component or application or to replace the component or application with a component or application having equivalent functionality. A deployment pipeline may include identifying the updated version or replacement, confirming licensing availability, obtaining the updated version or replacement, such as by downloading from a third party server to a server under the control of the organization, performing testing of the updated version or replacement, and, responsive to successful testing, deploying the updated version or replacement in a production environment.

In embodiments, in addition to or as an alternative to comparing the health score of an application or component to a threshold, the trend of the health score may be monitored. If the health score changes over time in a direction indicative of decreasing health of the component or application, such as more than a threshold value or percentage over a given time period, or over any time period from a prior level, or during more than a threshold number of consecutive periods, then one or more automatic responses are triggered.

In embodiments, a technology currency score of an application may be based on scores of components and on a design level technology debt of the application. A design level technology debt of an application may be a determination based on a lack of compliance with applicable enterprise architectural standards. By way of example, an application architecture may be compared with a published document that incorporates current enterprise architectural standards. Any aspect in which the current condition of the application fails to meet those standards may be determined based on the comparison.

In embodiments, the design level technology debt may be determined only in response to consideration of a new application, or to a significant update or modification of a new application. In those embodiments, the design level technology debt is not determined on a periodic basis for installed applications.

Exemplary current enterprise architectural standards may include: simplification; modernization; standard and architecture decision alignment; pattern alignment; and software architecture documentation completeness. Simplification in software architecture may refer to including a lower number of features in a software architecture than would be required to perform the requirements of the function. An architecture that lacks simplicity and hence would have a relatively low score on this standard would include a relatively large number of features. Modernization may refer to the use of current architecture, in contrast to the use of legacy tools or older software. Software that is built using tools and platforms that are expected to have a long life may have a higher score on the modernization factor than software built using tools that are older or are expected to have a relatively short life. Standard and architecture decision alignment may be a determination that architectural decisions of the application, as documented in an architectural decision document, are aligned with the enterprise architectural standards. If architectural decisions as reflected in architectural decision documents for the application are generally the same as the enterprise architectural standards, the application will have a relatively high score on this standard, as compared to an application in which architectural decisions as reflect in architectural decision documents differ from the enterprise architectural standard. Pattern alignment refers to the alignment between architectural solutions to be applied to problems commonly encountered in software architecture as specified in architectural standards, and the solutions employed in the application. If review of architectural solutions employed in the application architecture shows that the employed architectural solutions are generally the same as or similar to the solutions specified in the architectural standards, then the application will have a high score on this standard, as compared to an application in which the review of architectural solutions employed in the application architecture shows that the employed architectural solutions are generally significantly different from the solutions specified in the architectural standards. Software architecture documentation completeness refers to the comprehensive nature of the documentation for the architecture of the application. If the software architecture documentation describes all features of the software architecture, a relatively high score will be received. If the assessment shows that architectural features are either not described in the architectural documentation or incompletely or inaccurately described, then a relatively low score will be received.

A determination may be made of either or both of a duration to resolve each of the aspects identified in the comparison and an estimated cost to resolve each of the aspects identified in the comparison. The determined duration to resolve the aspects identified in the comparison and the estimated cost to resolve the aspects identified in the comparison may be mapped to normalized scales and combined to produce a scaled design level technology debt of an application.

Figure 1:
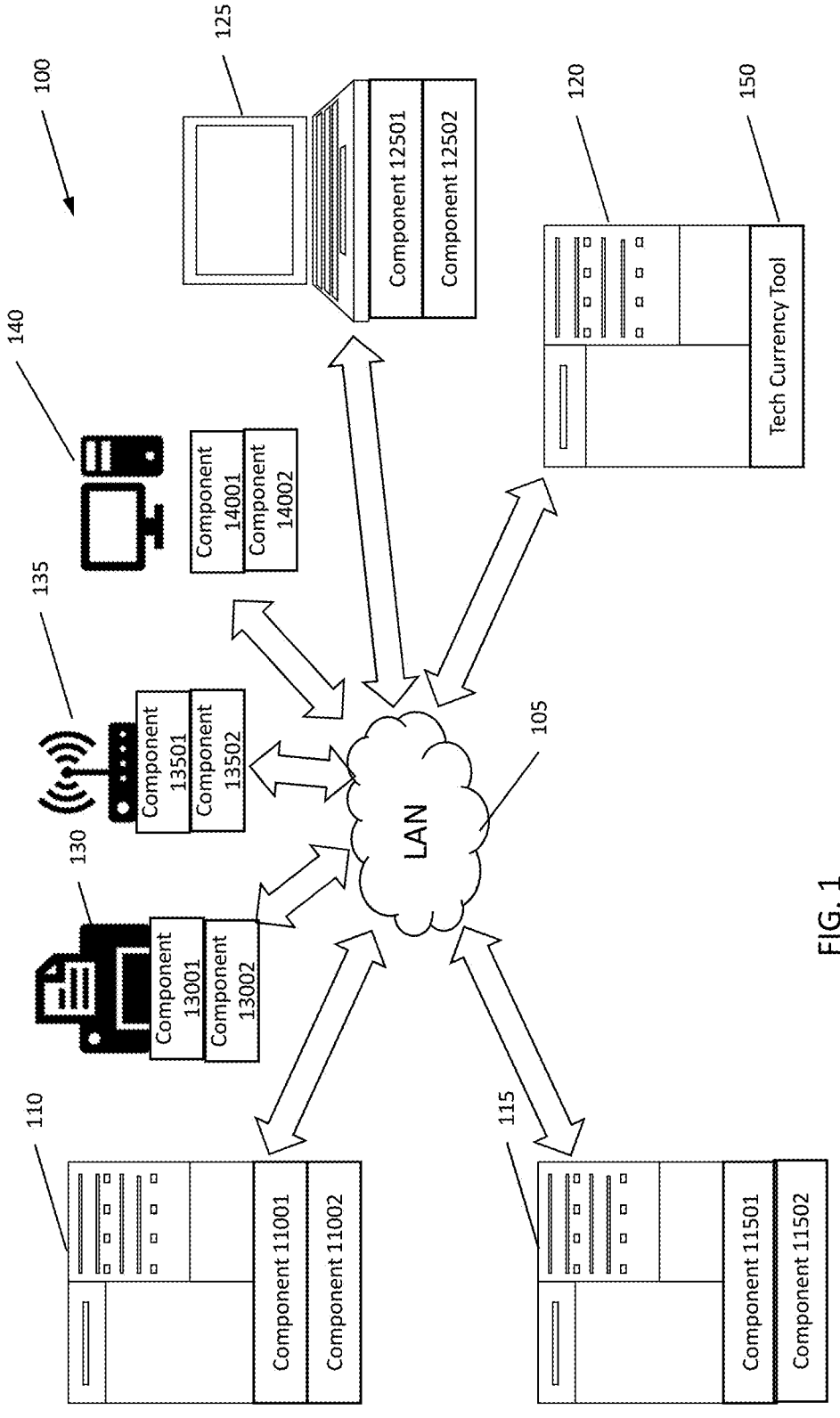
FIG. 1 shows an exemplary computer architecture in which embodiments of the present invention may be implemented.

FIG. 1 shows an example system 100 in which embodiments of the invention may perform technology currency assessment. System 100 may be a computer system of an entity, which may include one or more interconnected networks, such as local area networks, and a variety of hardware components, including computer servers, routers, printers, copiers, laptop computers, desktop computers, and other components. For illustrative purposes, system 100 includes local area network 105, having connected therein hardware elements first computer server 110, second computer server 115, third computer server 120, laptop computer 125, printer 130, wireless router 135 and desktop computer 140. Arrows schematically illustrate bidirectional data flows between LAN 105 and each of the connected hardware elements. Bidirectional data flow may include querying requests from third computer server 120 via LAN 105 to each hardware element and responsive data flows from each hardware element including data identifying components and including responsive component information.

First computer server 110 has exemplary components 11001, 11002 schematically illustrated, and in fact has numerous installed components. The installed components of first computer server 110 may include software and additional hardware components.

Second computer server 115 similarly has exemplary components 11501, 11502 schematically illustrated. Laptop computer 125 similarly has exemplary components 12501, 12502 schematically illustrated. Printer 130 may have exemplary components 13001 and 13002, schematically illustrated, and wireless router 135 has exemplary components 13501 and 13502, schematically illustrated. Desktop computer 140 similarly has exemplary components 14001 and 14002, schematically illustrated.

Each of first computer server 110, second computer server 115, laptop computer 125, printer 130 and wireless router 135 may have thousands of software components. Those software components may in some cases be the same software components installed and operating on different hardware items, e.g., same software components installed on both first computer server 110 and second computer server 115, as well as different software components installed on different devices. Across an entity computer system having hundreds or thousands of devices, an entity computer system may have hundreds of thousands or millions of installed components. Similarly, each of the devices may have tens or hundreds of hardware components, and an entity computer system may have many thousands of hardware components.

Third computer server 120 has installed one or more software programs labeled technology currency tool 150. Technology currency tool 150 causes third computer server 120 to perform operations relating to technology currency as described in this specification. Computer server 120 may include one or more data storage devices and databases to store data relating to components identified on system 100 and to technology currency determinations relating to those components.

Laptop computer 125 may be configured for display of dashboards and other data representations of technology currency information obtained and generated by computer server 120. Other devices may be employed for display of dashboards and other data representations of technology currency information, such as desktop computers, cellular telephones, other wireless communication devices, personal digital assistants, computers, tablet computers, smartphones, other mobile display devices, or combinations thereof.

Figure 2:
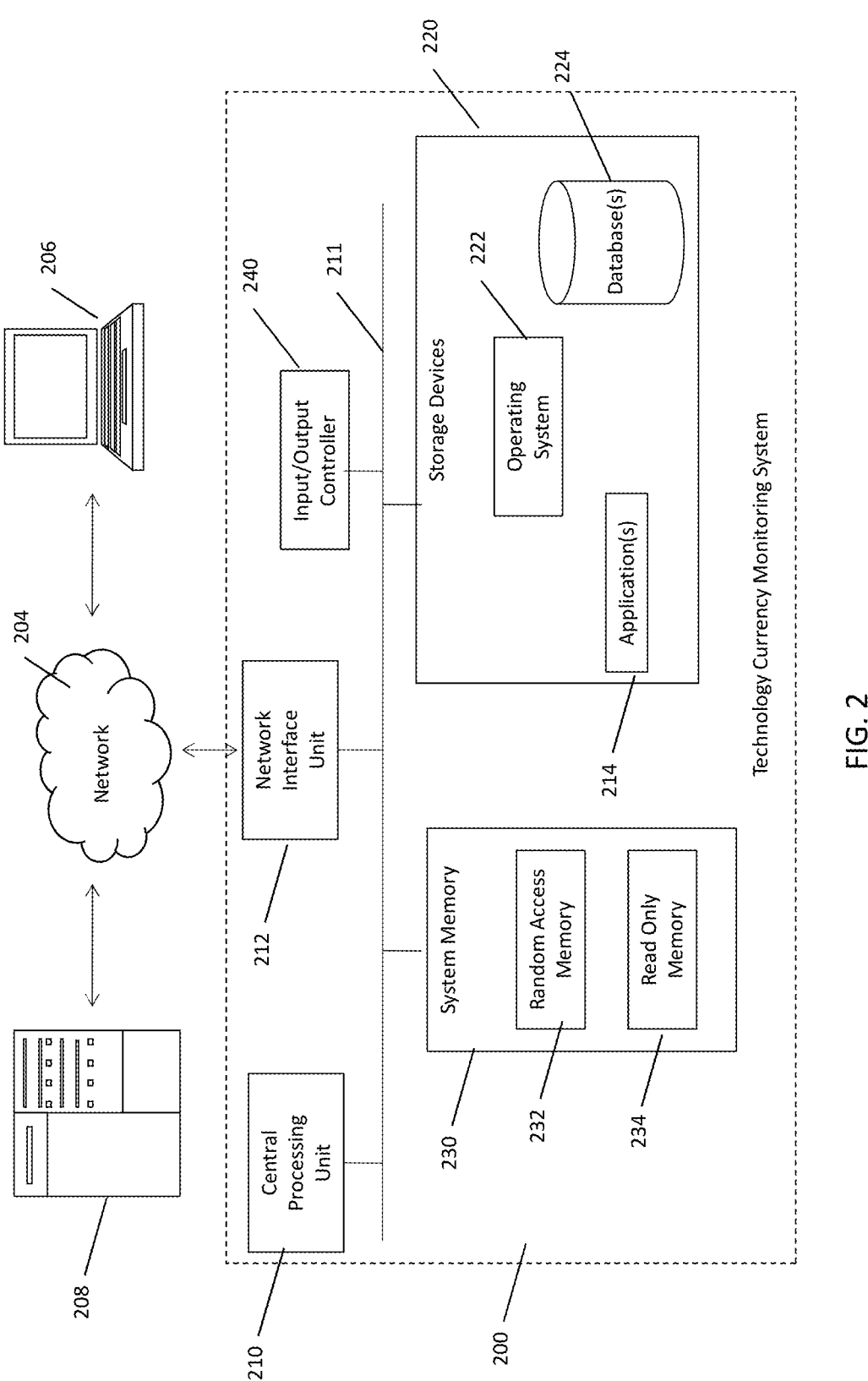
FIG. 2 shows an exemplary computer system that may be used for implementation of embodiments of the present invention.

Referring to FIG. 2, an exemplary computer system 200 for use in an implementation of the invention will now be described. Computer system 200 may be configured to perform technology currency monitoring operations of all types disclosed herein. System 200 may be connected to a network 204 which may connect to user devices, such as laptop 206 and other display subsystems, and to system servers 208, which may have installed components and applications. System 200 includes a central processing unit or processor 210 that executes instructions contained in programs such as technology currency monitoring application program(s) 214, stored in storage devices 220. Processor 210 may provide the central processing unit (CPU) functions of a computing device on one or more integrated circuits. As used herein, the term "processor" broadly refers to and is not limited to a single- or multi-core general purpose processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

Storage devices 220 may include suitable media, such as optical or magnetic disks, fixed disks with magnetic storage (hard drives), tapes accessed by tape drives, and other storage media. Processor 210 communicates, such as through bus 211 and/or other data channels, with network interface unit 212, storage devices 220, system memory 230, and input/output controller 240. System memory 230 may further include non-transitory computer-readable storage media such as a random access memory 232 and a read only memory 234. Random access memory 232 may store computer-readable instructions in the form of processor-executable code provided by application program(s) 214 to implement embodiments of the present invention. System 200 further includes an input/output controller 240 that may communicate with processor 210 to receive data from user inputs such as pointing devices, touch screens, and audio inputs, and may provide data to outputs, such as data to video drivers for formatting on displays, and data to audio devices.

Storage devices 220 are configured to exchange data with processor 210, and may store programs containing processor-executable instructions, and values of variables for use by such programs. Processor 210 is configured to access data from data storage devices 220, which may include connecting to storage devices 220 and obtaining data or reading data from the storage devices, or placing data into the storage devices. Storage devices 220 may include local and network accessible mass storage devices, and may include cloud-based storage. Storage devices 220 may include media for storing operating system 222 and mass storage devices such as database storage 224 for storing data related to technology currency of components, such as a component inventory. Database storage may be or include one or more relational databases, hierarchical databases, object-oriented databases, one or more flat files, one or more spreadsheets, and/or one or more structured files. The database may be managed by one or more database management systems (not depicted), which may be based on a technology such as Microsoft SQL Server, MySQL, Oracle Relational Database Management System (RDBMS), PostgreSQL, a NoSQL database technology, and/or any other appropriate technology.

Communications interface unit 212 may communicate via network 204 with other systems and devices of an entity, such as system elements implementing components the currency of which are assessed using the technology currency tool system 200, as well as other servers, computer systems of remote sources of data, and with systems for implementing instructions output by central processing unit 210. System 200 may also be configured in a distributed architecture, wherein databases and processors are housed in separate units or locations. Some such servers perform primary processing functions and contain at a minimum, a RAM, a ROM, and a general controller or processor. In such an embodiment, each of these servers is attached to a communications hub or port that serves as a primary communication link with other servers, client or user computers and other related devices. The communications hub or port may have minimal processing capability itself, serving primarily as a communications router. A variety of communications protocols may be part of the system, including but not limited to: Ethernet, SAP, SASTM, ATP, Bluetooth, GSM and TCP/IP. Network 204 may be or include wired or wireless local area networks and wide area networks, and over communications between networks, including over the Internet.

One or more public cloud, private cloud, hybrid cloud and cloud-like networks may also be implemented, for example, to handle and conduct processing of one or more transactions or processing of embodiments of the present invention. Cloud based computing may be used herein to handle any one or more of the applications, storage and connectivity requirements of embodiments of the present invention. For example, one or more private clouds may be implemented to perform operations relating to technology currency monitoring of embodiments of the present invention. Furthermore, any suitable data and communication protocols may be employed to accomplish the teachings of the present invention.

Network interface unit 212 may receive data including component inventory data and component data, or may receive component attribute data for use in determining component health scores. Central processing unit 210 executes program instructions, such as program instructions provided by application 214 for implementing steps of the technology currency monitoring system and method. Databases 224 may include component inventory data and technology currency determinations of components, applications and business capabilities, as well as other data relating to technology currency.

FIG. 3A illustrates an exemplary table of data relating to technology currency for computer system components in an illustrative embodiment of the present invention. By way of example, table 300, which may be an example of a data table in database 224 of FIG. 2, illustrates attribute values, overall scores, and assessments, for each of ten illustrative components in columns. Four of the attributes, supportability, remaining life span, stability and span, are technology debt attributes, indicated at 310. Technology debt attributes measure specific aspects of the components and the extent of their installation in the entity computer system.

As noted above, supportability(S) is a measure of the ability of entity personnel or third parties to provide support for the component, including such factors as ability to monitor performance of the component, identify exceptions or faults of the component, debug or isolate exception or faults to determine causes, and provide maintenance, such as replacement parts, debugging, code updates and other software maintenance. Expected remaining life span (E) of a component is a measure of a time remaining for anticipated support provided by a supplier or manufacturer. The expected remaining life span of a component may be a published remaining time for support to be provided generally for a component, such as off-the-shelf software supported by a manufacturer, or remaining term of a support contract provided by a supplier. Stability (T) is a measure of the ability of a component to maintain normal processing over time periods and under a variety of different demands, and may be measured based on such factors as duration between detected exceptions or faults. Span (P) is a measure of to the extent to which a component is implemented within an entity computer system, or the footprint of the component within the entity computer system.

Strategic criticality attributes measure values of the component as related to strategic goals of the entity. Two strategic criticality attributes are illustrated in the table of FIG. 3A, at 320, namely business criticality (B) and alignment with strategic technology roadmap (A). The strategic criticality attribute business criticality measures the importance of the component to the business goals of the business. For example, a component that performs essential steps to processing customer requests in real time will have a business criticality score indicative of a high level of business criticality. A component that performs only operations relating to internal operations that have low time sensitivity would have a low business criticality score.

The strategic criticality attribute alignment with strategic technology road map measures the extent to which the component serves important goals set forth in a strategic technology road map of the entity. A strategic technology road map of the entity may be a document identifying goals relating to technology strategy.

In an embodiment, a component may be assessed on a scale with respect to each of a plurality of goals identified in the strategic technology road map. On a scale, for a goal as to which the component serves the goal, the component may be assessed with a good score; for a goal as to which the component does not advance the goal, or detracts from achievement of the goal, the component may be assessed with a score indicative of a poor value. The assessed scores may be added and normalized to determine the value of the attribute alignment with strategic technology road map.

The scores for those attributes are each determined on a scale. The same scale may be employed for each attribute. The scale may be numeric. In embodiments, a uniform scale, having whole number values from a lowest value to a highest value, may be employed for each attribute. In determining values for each attribute on a scale, suitable normalization factors may be employed.

In the illustrated example of FIG. 3A, each technology debt attribute is scored on a scale of whole numbers from 1 to 9, with 1 being a best possible value, indicating no technology debt, and 9 being a worst possible value, indicating highest technology debt for that attribute. A value of 5 indicates an intermediate value of technology debt. The greater the score of the technology debt attribute, the larger the technology debt incurred by the component. The strategic criticality attributes are also scored on a scale of 1 to 9, in which a score of 1 indicates least critical, and 9 indicates most critical. The higher the score of the strategic attributes, the greater the negative impact will be of the technology debt on the overall health score of the component.

The health score for each component may be calculated as follows in embodiments. In the example illustrated in FIG. 3A, the score of each technology debt attribute is summed. The score of each strategic criticality attribute is summed. The two sums are then multiplied together. The resulting product may be normalized.

By providing for multiplication of the technology debt scores by the strategic criticality scores, the resulting score provides for a combined measure of the technology debt of the component and the importance of the component to the overall system. This result provides for more accurate identification of which components require attention and action, with a likelihood of better avoiding consequences of technology debt, such as inefficiencies and errors, and system downtime, than an assessment that does not take into account strategic criticality.

This calculation may be expressed as the following formula:

$$(S + E + T + P) * (A + B) = H, \qquad \text{(Equation 1)}$$

Where: S is the supportability score; E is the expected remaining life span score; T is the stability score; P is the span score; B is the business criticality score; A is the alignment with strategic technology roadmap score; and H is the raw, or not normalized, health score for the component.

The calculated raw health score for the component may then be normalized to be within a given range.

By way of example, to normalize a raw component score to a range from 0 to 1, the following formula may be employed:

$$z_i = a + (x_i - \min(x))(b - a)/(\max(x) - \min(x)) \qquad \text{(Equation 2)}$$

where:
$z_i$: The ith normalized value in the dataset
$x_i$: The ith value in the dataset
$\min(x)$: The minimum value in the dataset
$\max(x)$: The maximum value in the dataset
$a=0$
$b=1$ In the example of component 11501 from FIG. 3A, the raw component score ($x_i$) is, inserting the values from FIG. 3A into Equation 1, $(5+5+5+9)*(9+9)=432$. The maximum value in the dataset $(\max(x))$ is $(9+9+9+9)*(9+9)=648$. The minimum value in the data set $(\min(x))$ is $(1+1+1+1)*(1+1)=8$. Applying Equation 2, the formula $z_i=a+(x_i-\min(x))(b-a)/(\max(x)-\min(x))$ gives $z_i=0+ (432-8)(1-0)/(648-8) =0.66$.

The assessment value defines component health scores from 0 to not greater than 0.40 as acceptable, greater than 0.40 to not greater than 0.70 as concerning, and from above 0.70 to 1.0 as critical. A component health score in the acceptable range indicates that no action will be taken with respect to technology debt of the component. A component health score in the concerning range indicates that a level of attention and action is required. By way of example, one or more of enhanced or more frequent monitoring may be automatically initiated. A component health score in the critical range indicates that a high level of attention and action is required, such as updating, replacement, or much more frequent monitoring, and one or more of those steps may be automatically initiated. The health score of 0.66 is the concerning range. Notably, the value of 9 for one of the technology debt attributes, which indicate a high level of technology debt, contribute to the score being in the critical range, even though the other three of the technology debt attributes have a moderate value of 5. The high values of both the strategic criticality attributes tend to increase the overall score, as the multiplication of the sum of the technology debt attribute scores by the sum of the strategic criticality scores magnifies the effect of the technology debt attribute scores if the strategic criticality scores are high.

In this example, the technology debt attribute scores and the strategic criticality attribute scores are on the same scale, and the sums are multiplied with no other adjustment. In other embodiments, the effect of strategic criticality scores may be magnified by multiplying one or more of the strategic criticality scores, or multiplying a sum of the strategic criticality scores, by a factor greater than 1, or by scoring the strategic criticality scores on a scale having a wider range of values than the technology debt attribute scores. In other embodiments, the effect of strategic criticality scores may be reduced by multiplying strategic criticality scores by a factor less than 1, for example.

Referring to component 11502 of FIG. 3A, an example is given of a component having somewhat higher values of technology debt attributes than component 11501, and high values of strategic criticality. In this component, two of the technology debt attributes have a value of 9, and two technology debt attributes have a value of 5. Each strategic criticality attribute has a value of 9. Thus, the raw component score given by Equation 1 is 504. The normalized health score for the component is 0.78, which is higher than the score of component 11501, and places the score in the critical range.

Referring to component 11503 of FIG. 3A, an example is given of a component having maximum scores of 9 of each of the technology debt attributes, and maximum scores of 9 of each of the strategic criticality attributes. The resulting raw health score for the component is 648, which is the maximum, or worst, possible value. As a result, the normalized score is 1.0, which is the maximum, or worst, possible value, and is in the critical range.

Referring to component 11504 of FIG. 3A, an example is given of a component having one technology debt attribute, supportability, having a low technology debt score of 1, while three technology debt attributes, expected remaining life span, stability, and span, each have high technology debt attribute scores of 9. Both of the strategic criticality attributes have scores of 9. The raw component health score given by Equation 1 is 504. The normalized health score is 0.78, which is in the critical range. Even though the raw component health score is lower than the score of component 11503, as a result of the low technology debt score of 1 of the supportability attribute in component 11504, the high values of the strategic criticality attributes multiply the high values of the technology debt scores for the other three technology debt attributes to result in the normalized health score in the critical range.

Referring to component 11505 of FIG. 3A, an example is given of a component that has the same scores as component 11504, except that the business criticality attribute score in component 11504 is 5, in contrast to the business criticality attribute score of 9 in component 11503. In component 11505 (as in component 11504), one technology debt attribute, supportability, has a low technology debt score of 1, while three technology debt attributes, expected remaining life span, stability, and span, each have high technology debt attribute scores of 9. As noted, of the strategic criticality attributes, the business criticality attribute has a score of 5, while the alignment with strategic technology roadmap score has a score of 9. The raw component health score given by Equation 1 is 392. The normalized health score is 0.60, which is in the concerning range. It may be seen that, as a result of the business criticality attribute score of 5, in contrast to the business criticality score of 9 of component 11504, the normalized health score is lower than the normalized health score of component 11504, even though the technology debt attribute scores are the same.

Referring to component 11506 of FIG. 3A, an example is given of a component that has the same scores as components 11504 and 11505, except that the business criticality attribute score in component 11506 is 1, in contrast to the business criticality attribute score of 9 in component 11504 and the business criticality attribute score of 5 in component 11505. In component 11506, one technology debt attribute, supportability, has a low technology debt score of 1, while three technology debt attributes, expected remaining life span, stability, and span, each have high technology debt attribute scores of 9. As noted, of the strategic criticality attributes, the business criticality attribute has a score of 1, while the alignment with strategic technology roadmap score has a score of 9. The raw component health score given by Equation 1 is 280. The normalized health score is 0.43, which is close to the low end of the concerning range. As a result of the business criticality attribute score of 1, in contrast to the business criticality score of 9 of component 11504 and the business criticality score of 5 of component 11505, the normalized health score is at the lower end of the concerning range, showing the influence of varying business criticality scores. Thus, a component, such as component 11506, with a relatively low business criticality score may be at the low end of the concerning range, and may require only an increased frequency of monitoring, while a different component (such as component 11504 or component 11505) with the same technology debt attribute scores, but which is more critical to business operations as reflected in higher business criticality scores, will have a score that indicates a need for actions such as more frequent monitoring, updating or replacement.

Referring to component 11507 of FIG. 3A, an example is given of a component that has two excellent scores among technology debt attributes, namely scores of 1 for the technology debt attributes supportability and expected remaining life span. The score of 1 for these technology debt attributes indicates a low level of technology debt for those attributes. For the other two technology debt attributes, stability and span, the technology debt value is 9, indicating a high level of technology debt. Both of the strategic criticality attributes, business criticality and alignment with strategic technology roadmap, have scores of 9, which are high scores. The raw component health score given by Equation 1 is 378. The normalized health score is 0.58, which is in the concerning range. Even though scores of two of the technology debt attributes are 1, for a low value of technology debt, the high values of technology debt indicated by the scores of the other two technology debt attributes, when multiplied by the high scores of the two strategic criticality attributes, bring the technology debt score of this component into the concerning range. If the technology debt attributes had the same scores, and the strategic criticality attributes had lower scores, then the scoring for this component might indicate a result in the acceptable range.

Referring to component 11508 of FIG. 3A, an example is given of a component that has three excellent scores among technology debt attributes, namely scores of 1 for the technology debt attributes supportability, expected remaining life span and stability. The score of 1 for these technology debt attributes indicates a low level of technology debt for those attributes. For the other technology debt attribute, span, the technology debt value is 9, indicating a high level of technology debt. Both of the strategic criticality attributes, business criticality and alignment with strategic technology roadmap, have scores of 9, which are high scores. Thus, the difference from the scores of component 11507 is that one of the technology debt attribute scores has been changed from 9, indicating a high level of technology debt, to 1, indicating a low level of technology debt. The raw component health score given by Equation 1 is 216. The normalized health score is 0.33, which is in the acceptable range. Thus, with three technology debt attribute scores of 1, the best score, even when multiplied by the sum of the high scores of the two strategic criticality attributes, the technology debt score of this component is in the acceptable range.

Referring to component 11509 of FIG. 3A, an example is given of a component that has excellent scores for all of the technology debt attributes, namely scores of 1 for all of the technology debt attributes. The score of 1 for technology debt attributes indicates a low level of technology debt. Both of the strategic criticality attributes, business criticality and alignment with strategic technology roadmap, have scores of 9, which are high scores. Thus, the difference from the scores of component 11508 is that all of the technology debt attribute scores are 1, where in component 11508, one of the technology debt attribute scores was 9, indicating a high level of technology debt, while the remaining technology debt attribute scores were 1. The raw component health score given by Equation 1 is 72. The normalized health score is 0.10, which is well in the acceptable range. Thus, with four technology debt attribute scores of 1, the best score, even when multiplied by the sum of the high scores of the two strategic criticality attributes, the technology debt score of this component is well within the acceptable range.

Referring to component 11510 of FIG. 3A, an example is given of a component that has excellent scores for all of the technology debt attributes, namely scores of 1 for all of the technology debt attributes. The score of 1 for technology debt attributes indicates a low level of technology debt. Both of the strategic criticality attributes, business criticality and alignment with strategic technology roadmap, also have scores of 1, which indicate the lowest level of strategic criticality. Thus, the difference from the scores of component 11509 is that the strategic criticality scores are changed from the maximum to the minimum. The raw component health score given by Equation 1 is 8. The normalized health score is 0.00, which is the minimum. No action is indicated for a component with this minimum score, other than continued monitoring. Thus, the minimum score is obtained by a component having minimum values of both technology debt attribute scores and strategic criticality scores.

Referring now to FIG. 3B, an alternative embodiment will be explained. In this alternative embodiment, table 350, which may be an example of a data table in database 224 of FIG. 2, illustrates technology debt attributes 360 and strategic criticality attributes 370 for illustrative components. The score of each technology debt attribute is on a scale from 1 to 9, in which 1 is highest or worst technology debt score, and 9 is the best score, indicating no technology debt. The scores of the strategic criticality attributes are on a scale from 1 to 9, in which 1 indicates a lowest level of strategic criticality, and 9 indicates a highest level of strategic criticality.

In the embodiment of FIG. 3B, the score of each technology debt attribute is summed. The score of each strategic criticality attribute is summed. The two sums are then multiplied together. This calculation may be expressed as the following formula:

$$(S + E + T + P) * (A + B) = \text{Component Score (Raw)} \qquad \text{(Equation 3)}$$

The calculated raw component score may then be normalized to be within a given range.

By way of example, to normalize a raw component score to a range from 0 to 10, the following formula may be employed:

$$zi = a + (xi - \min(x))(b - a)/(\max(x) - \min(x)) \quad \text{(Equation 4)}$$

where:

$zi$: The ith normalized value in the dataset
$xi$: The ith value in the dataset
$\min(x)$: The minimum value in the dataset
$\max(x)$: The maximum value in the dataset
$a=0$
$b=10$ In the example of component 11001 from FIG. 3B, the raw component score $(xi)$ is, inserting the values from FIG. 3B into Equation 3, $(3+3+3+9)*(9+9)=324$. The maximum value in the dataset $(\max(x))$ is $(9+9+9+9)*(9+9)=648$. The minimum value in the data set $(\min(x))$ is $(1+1+1+1)*(1+1)=8$. Applying Equation 4, the formula $zi=a+(xi-\min(x))(b-a)/(\max(x)-\min(x))$ gives $zi=0+(324-8)(10-0)/(648-8)=4.94$.

The assessment value for the example of FIG. 3B defines component scores from 0 to 4.99 as critical, from 5 to 6.99 as concerning, and from 7 to 10 as acceptable. Accordingly, the health score of 4.94 is critical. Notably, the relatively low values for three of the technology debt attributes, which indicates a significant technology debt in this embodiment, contribute to the score being in the lowest range. The high values of business criticality attributes tend to increase the score, such that the score is close to the threshold for concerning, as opposed to critical.

In the example of component 11002 of FIG. 3B, the raw component score is 432, and the normalized health score of the component is 6.63. The normalized score of 6.63 results in an assessment of "concerning," as reflected in FIG. 3B. As the technology debt attribute scores are higher in this example than in the example of component 11001, indicating a lesser degree of technology debt, while the strategic criticality scores are the same, the overall score for this component is higher than the score for component 11001.

In the example of component 13501 of FIG. 3B, the technology debt attribute scores are all at the maximum value on the scale of 9, which indicates no technology debt. Accordingly, with strategic criticality scores at the maximum value of 9, the overall normalized score is at the maximum of 10.00, and thus is acceptable.

In the example of component 13502 of FIG. 3B, the technology debt attribute scores are the same as in component 13501 of FIG. 3B, except that one of the technology debt attribute scores, for the supportability attribute, have a value of 1, which is the lowest value on the scale. The overall normalized score is 7.75, which is still in the acceptable range. Thus, by comparing the technology debt scores of components 13501 and 13502, it can be seen that the change in one technology debt attribute from a value of 9, which is the maximum value on the scale, to a value of 1, which is the minimum value on the scale, reduces the normalized score from 10.00 to 7.75. As 7.75 is greater than the threshold value for an acceptable score, the component has an acceptable health score.

In the example of component 13503 of FIG. 3B, the technology debt attribute scores are the same as in component 13501 of FIG. 3B, except that two technology debt attribute scores, those for supportability and stability, have a value of 1, which is the lowest value on the scale, and thus indicates the greatest amount of technology debt. The overall normalized score is 5.5, which is in the concerning range. Thus, by comparing the technology debt scores of components 13501 and 13503, it can be seen that the change in two technology debt attributes from a score of 9, which is the maximum value on the scale (indicating no technology debt), to a score of 1, which is the minimum value on the scale (indicating a high level of technology debt), reduces the normalized score from 10.00 to 5.5.

In the example of component 13504 of FIG. 3B, the technology debt attribute scores are the same as in component 13501 of FIG. 3B, except that three technology debt attribute scores, those for supportability, expected remaining life span, and stability, have a value of 1, which is the lowest value on the scale (indicating a high level of technology debt). The overall normalized score is 3.25, which is in the critical range. Thus, by comparing the technology debt scores of components 13501 and 13504, it can be seen that the change in three technology debt attributes from a score of 9, which is the maximum value on the scale, to a score of 1, which is the minimum value on the scale, reduces the normalized score from 10.00, which is the maximum possible score, to 3.25, which is in the critical range.

The number, ranges and naming of assessments, i.e., three assessments labeled as critical, concerning and acceptable, is exemplary, and there may be more assessments, with different corresponding ranges of health scores.

Figure 3C:
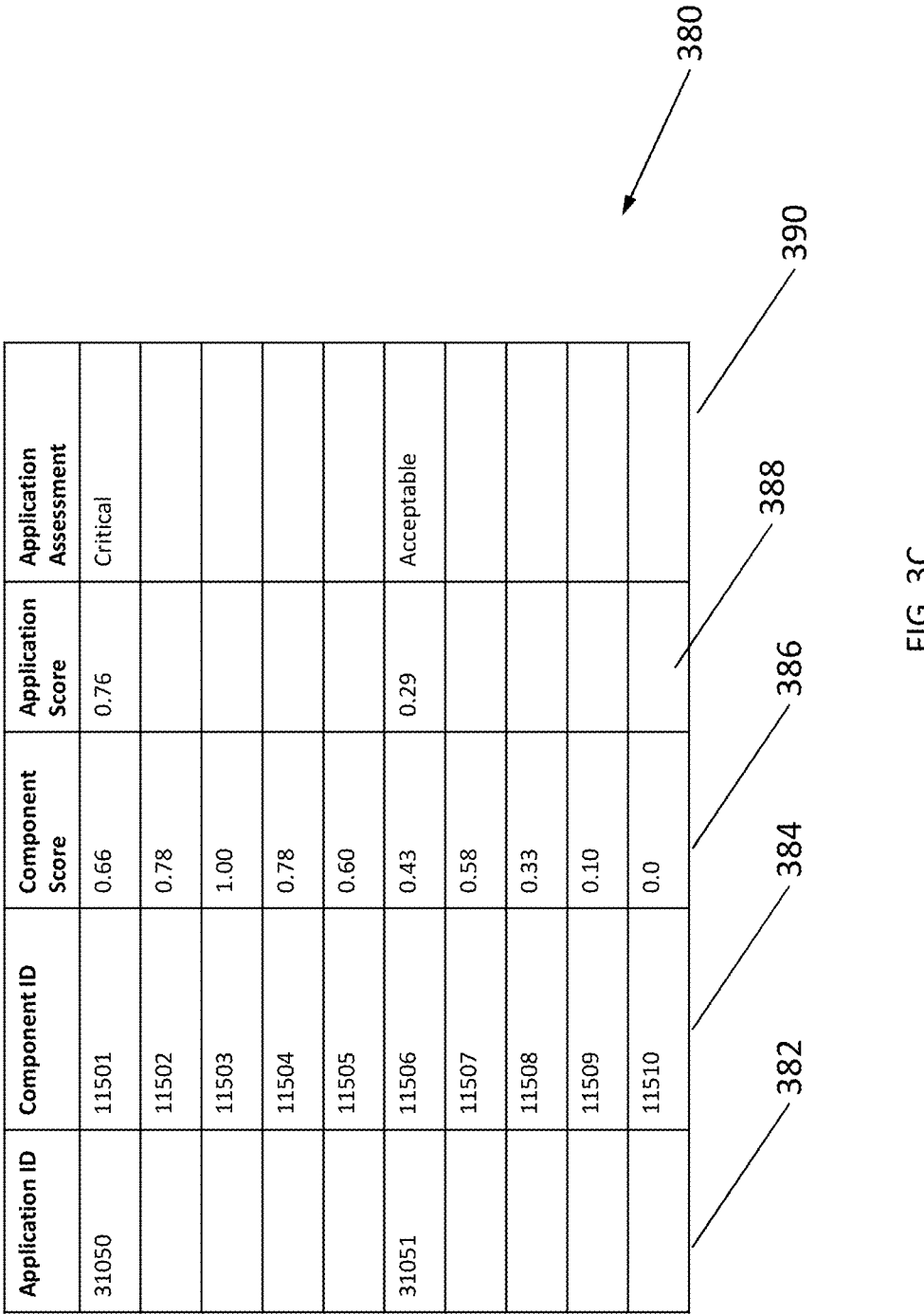
FIG. 3C shows an exemplary table of data relating to technology currency for computer system applications in an illustrative embodiment of the present invention.

Referring now to FIG. 3C, there is shown an exemplary table 380 of data relating to technology currency for computer system applications in an illustrative embodiment of the present invention. Table 380 may be an example of a data table stored in databases 224 of FIG. 2. Table 380 contains data for two exemplary applications, identified in column 382. For each of the applications identified in column 382, table 380 identifies a plurality of corresponding components in column 384. Each component has an associated component score identified in column 386, which score is a technology debt score or health score determined in accordance with an embodiment as explained in connection with FIG. 3A above. The application score in column 388 is a measure of the technology debt or technology currency of the application, determined based on the scores of the components from column 386. In this example, the application score is an unweighted average of the component scores, although other formulas may be employed in embodiments to determine an application score based on scores of corresponding components. The application assessment, shown in column 390, maps the application score to an application assessment. In an exemplary assessment, any application score from 0 to not more than 0.40 is acceptable; an application score greater than 0.40 to not greater than 0.70 is concerning; and an application score greater than 0.70 to 1.0 is critical. Here, one application has a score of 0.76 and is thus in the critical range; the other illustrated application has a score of 0.29 and is thus in the acceptable range. Thus, the present system provides for quantified assessment of technology debt of applications, in a manner that can be performed by computers, to identify applications that require action or attention based on technology debt.

Figure 4A:
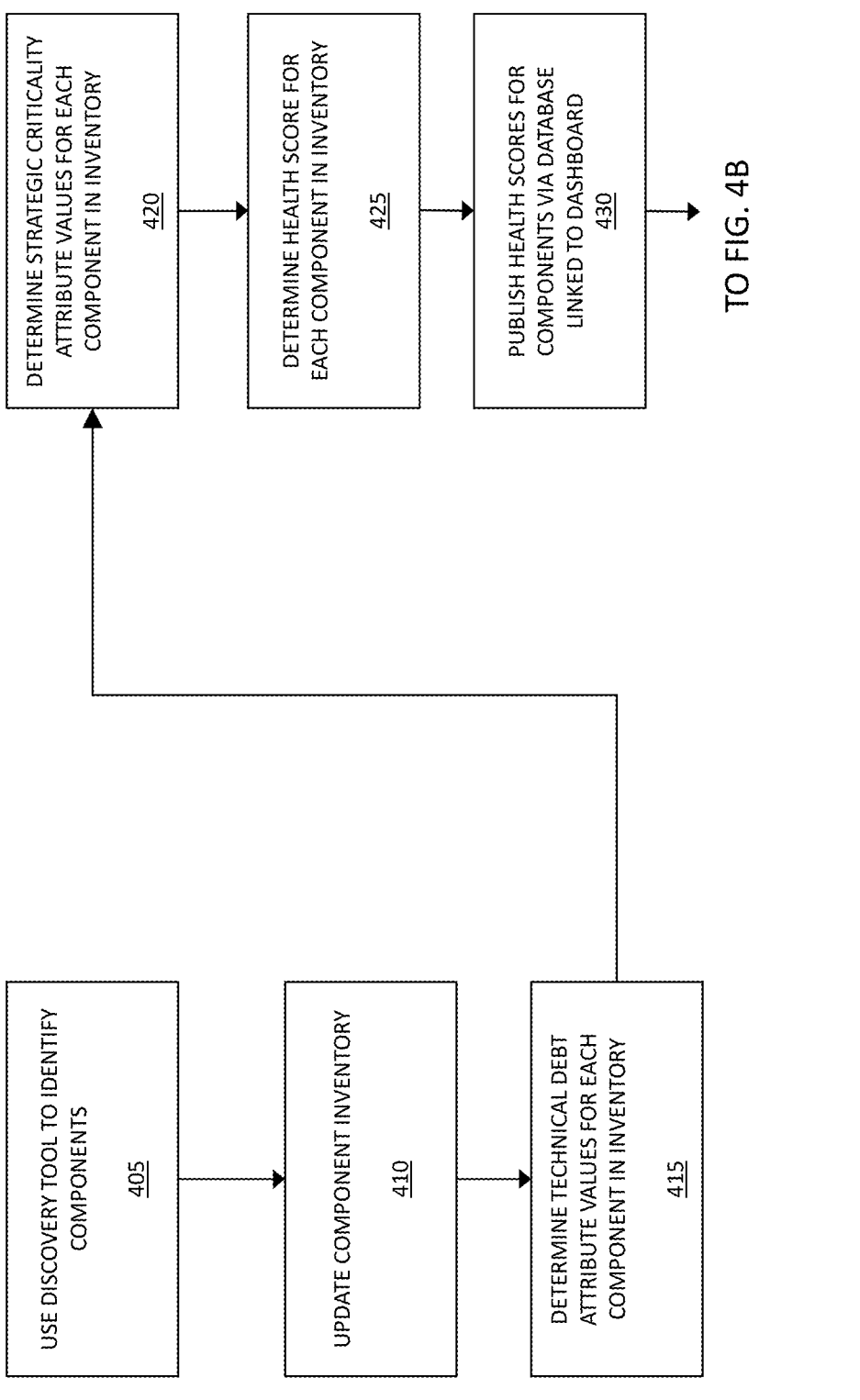
FIGS. 4A-4C show an exemplary process of an illustrative embodiment of the present invention.
Figure 4B:
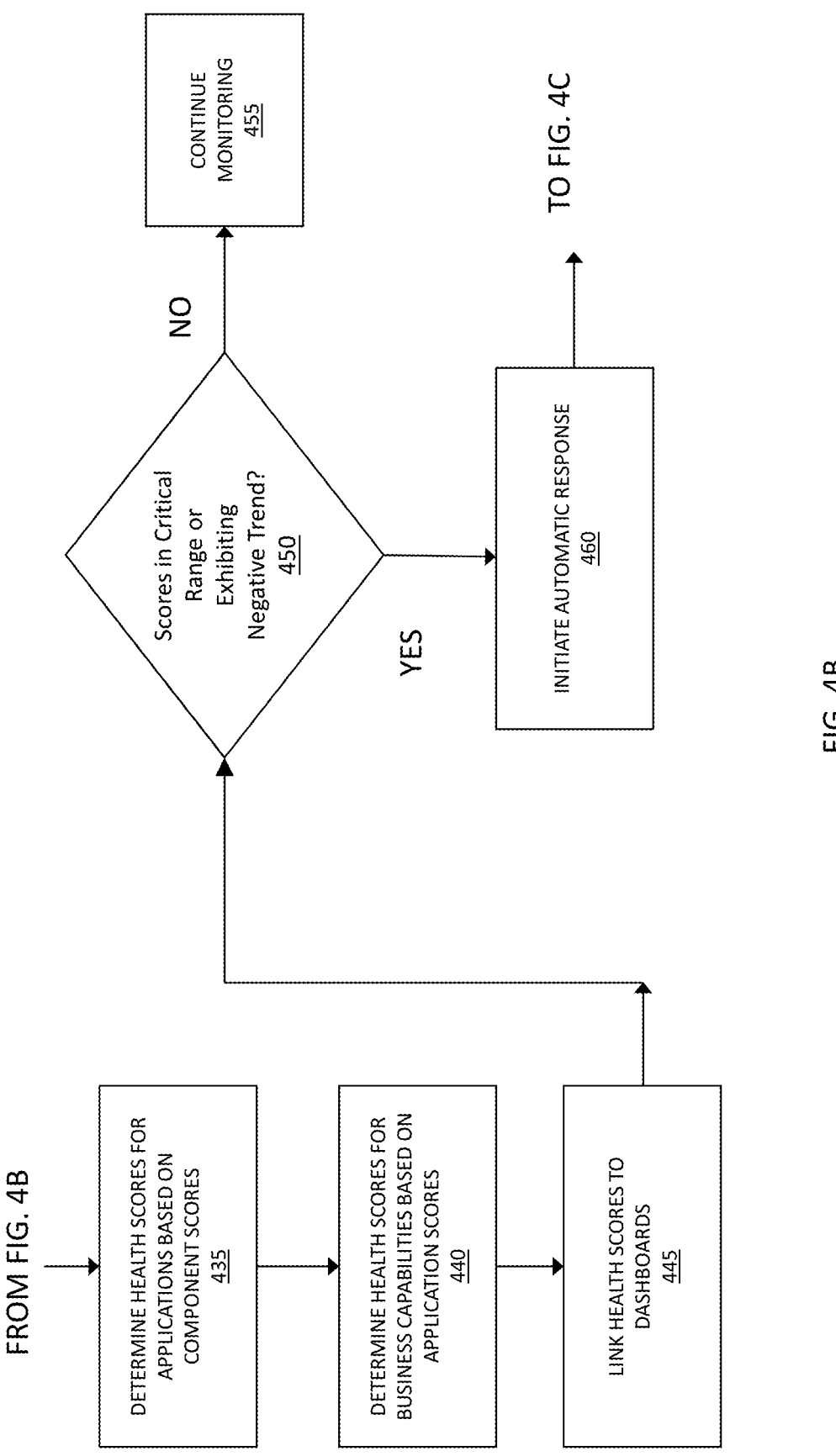
Figure 4C:
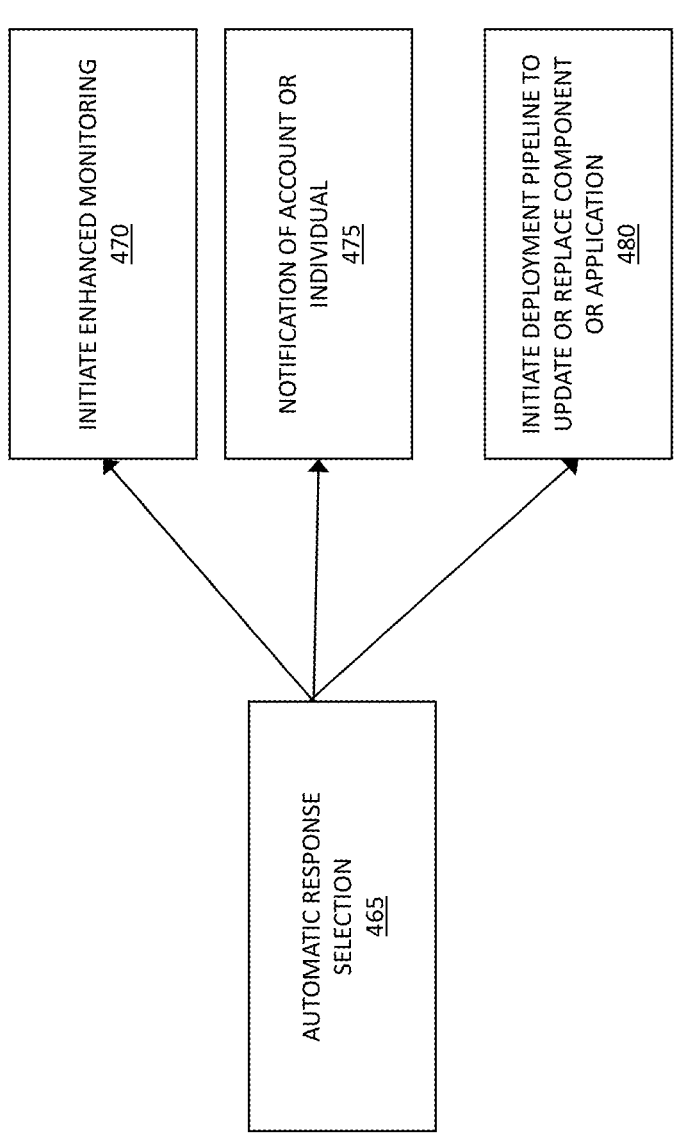

FIGS. 4A, 4B, and 4C illustrate a method 400 for administering technology currency monitoring and response that may be performed by some or all of the elements of the system 100 described with respect to FIG. 1 according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a non-transitory computer-readable storage medium may store thereon instructions that when executed by one or more processors result in performance of methods according to any of the embodiments described herein. The one or more processors and instructions may be embodied in a system server, such as exemplary server 120 of FIG. 1 or exemplary server 705 of FIG. 7, or in central processing unit 210 and applications 214 of FIG. 2.

At step 405, a discovery tool is employed to identify all components installed and operating on the entity computer system. The discovery tool may be operated on a periodic basis to identify all components, such as a period of weekly, monthly, quarterly, or another period. For example, the discovery tool may transmit messages to each hardware device associated with the entity computer system to identify all installed components and provide a return message. At step 410, a stored component inventory is updated with the results from the discovery tool. The stored component inventory may also be verified via other means, such as manual verification or updating.

At step 415, the technical debt attribute values are determined for each of the identified components in the component inventory. For supportability, the values may be based on determined based on searching of suitable document inventories to identify such aspects as existence of active contracts for ongoing support, review of stored documents, such as internal and external email and other messages referencing each component to assess vocabulary in the messages to determine relationship to supportability, using suitably trained artificial intelligence agents. The values may also be based on polling of entity personnel responsible for administration of components.

For expected remaining life span, the values may be based on searching of text of documents relating to support of the component, or on polling of personnel responsible for administration of the component.

For stability, the values may be based on searching of documents relating to the component to identify reports or assessments regarding stability or indications of lack of stability, and on polling of responsible personnel.

For span, the values may be based on numbers of devices reporting installation of the component as a fraction of total devices in the computer system.

At step 420, the scores for the strategic criticality attributes for the component are determined. These scores may be determined based on reviewing text of suitable documents, such as by suitably trained artificial intelligence module, or by polling of personnel responsible for administration of the component.

At step 425, the score for the component is determined based on the scores for the technology debt attributes and the scores for the strategic criticality attributes. As discussed above, the component score may be based on a sum of the unweighted technology debt attributes scores multiplied by a sum of the unweighted strategic criticality attribute scores, which may be normalized. Unweighted attribute scores are advantageous in preventing manipulation of results.

At step 430, the determined component scores may be published, such as by being stored in a database accessible to a dashboard application for monitoring component health. A variety of display and dashboard technologies may be provided to permit users to view via user devices, such as laptop 206 of FIG. 2, technology currency information relating to components.

At step 435, referring to FIG. 4B, scores for applications may be determined. Scores for applications may be based on scores of each of the components of an application. By way of example, the score for an application may be an unweighted average of the scores of the components of the application, though other formulas may be used in embodiments. By way of example, for an application having components C1, C2, C3, C4 and C5, with the following calculated scores according to the embodiment of FIG. 3A, the application's score will be the unweighted average, as shown in Table 1 below:

TABLE 1

| Component/ | Health Score |
|---|---|
| C1 | 0.4 |
| C2 | 0.7 |
| C3 | 0.6 |
| C4 | 0.2 |
| C5 | 0.3 |
| Application | 0.44 |

Thus, the unweighted average of the score of the five components is the application score of 0.44. Application scores may be assessed similarly to component scores. For example, an application score from 0.0 to not greater than 0.40 may be deemed acceptable; an application score above 0.40 and not greater than 0.70 may be deemed concerning, and an application score greater than 0.70 and up to the maximum of 1.0 may be assessed as critical. Technology attribute scores of applications may be accessed via various display programs to provide a wide variety of available access and alerts for display on user devices.

At step 440, health scores are determined for business capabilities. For each business capability, the corresponding applications are accessed. The correspondences between business capabilities and applications may be stored in a database. The health score of the business capability may be based on the scores of each of the corresponding applications, such as an unweighted average, or using a different formula in embodiments.

At step 445, determined health scores, or technology currency scores, for components, applications and business capabilities are linked to dashboards for access and review by users from user devices. FIG. 9 illustrates an exemplary dashboard display.

At step 450, it is determined whether any health scores are below a threshold, such as below a threshold that places the scores in a critical range, or exhibiting a negative trend, or one of below a threshold and exhibit a negative trend. If the health score decreases over time, such as more than a threshold value or percentage over a given time period, or over any time period from a prior level, or during more than a threshold number of consecutive periods, then a negative trend is determined. For any components, applications or business capabilities for which the score is not in a critical range, and does not exhibit a negative trend, then, as indicated at step 455, monitoring continues as normal, such as being reviewed on a default or normal frequency.

For any components, applications or business capabilities for which the score is in a critical range, or a negative trend is determined the system may, as indicated at step 460, automatically take one or more responses. The technology currency tool may select one or more automatic responses, as indicated at step 465, based on one or more factors, such as applicability of available responses. The selected automatic response may include monitoring 470 of components of the application more frequently, as compared to a default or normal frequency; notification 475 of an account associated with an owner or individual assigned to have oversight for the component or application; or automatically triggering 480 a deployment pipeline to replace the component or application with an updated version of the same component or application or to replace the component or application with a component or application having equivalent functionality. A deployment pipeline may comprise a set of procedures, stored in memory and accessible to one or more processors, that are to be performed in connection with replacing a component or application with an updated version or with a replacement of equivalent functionality, and may include steps such as confirming currency of relevant licenses, obtaining the code, performing certain tests on the code, assessing the test results to determine if the test results are consistent with installing the component or application in a production environment, and providing installation in the production environment and associated monitoring to determine acceptable performance.

Figure 5:
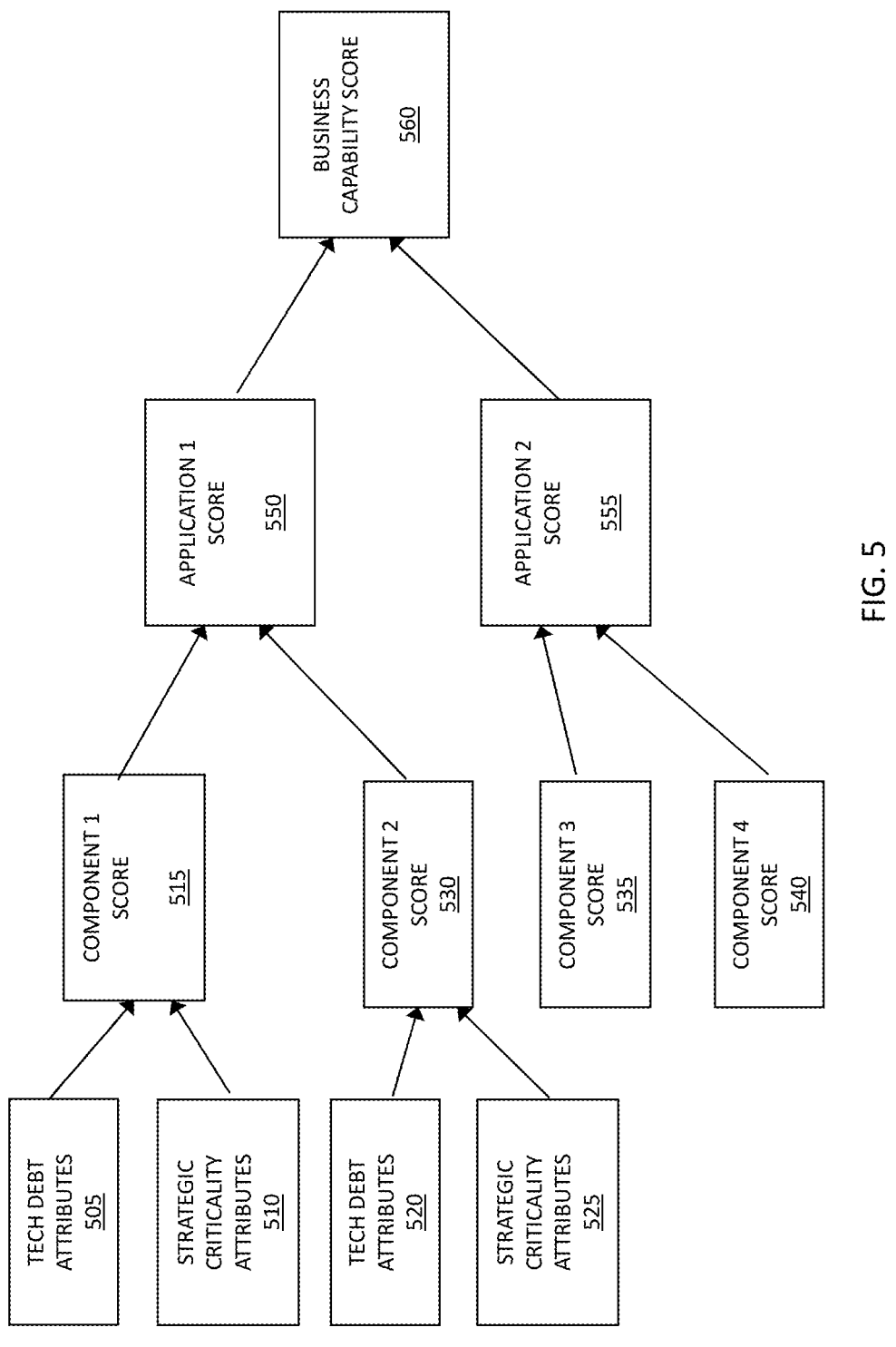
FIG. 5 shows an exemplary data flow in an illustrative embodiment of the present invention.

Referring to FIG. 5, data flows in an exemplary embodiment of the invention will be explained. The data flows may be implemented by an application program, such as an embodiment of application program 214 of FIG. 2. In the data flow, technical debt attributes 505 of component 1, and strategic criticality attributes 510 of component 1 are employed to determine component 1 technology currency score 515. Similarly, for component 2, technical debt attributes 520 and strategic criticality attributes are employed to determine component 2 technology currency score 530. Component 1 and component 2 correspond to application 1, which correspondence may be stored in a data storage accessible to one or more computer processors executing an application program, and component 1 score 515 and component 2 score 530 are inputs to determine application 1 technology currency score 550.

Component 3 technology currency score 535 and component 4 technology currency score 540 contribute to application 2 score 555, as application 2 corresponds to component 3 and component 4. Component 3 and component 4 scores are based on technology debt attributes and strategic criticality attributes of the respective components, which attributes are not shown.

Business capability score 560 is based on the application 1 score 550 and application 2 score 555. As may be seen, the technology debt attributes and strategic criticality attributes of each component that ultimately corresponds to the business capability contribute to the business capability score.

Figure 6:
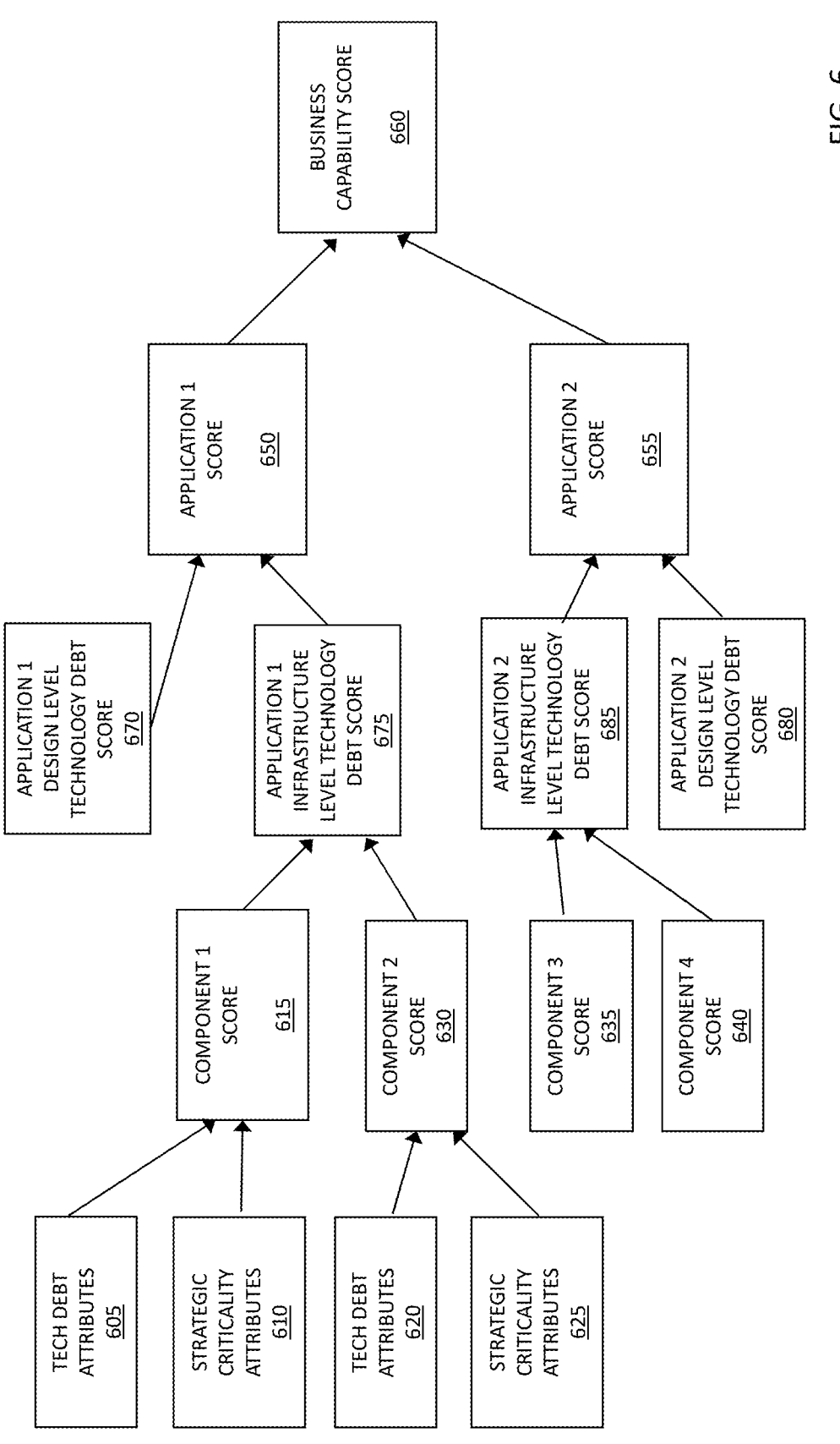
FIG. 6 shows an exemplary data flow in an illustrative embodiment of the present invention in which design level technology debt score of an application is a factor.

Referring to FIG. 6, data flows in an embodiment in which design level technology debt of an application is a factor will be explained. In this embodiment, for each application, an infrastructure level technology debt score is determined, such as explained above with respect to FIGS. 3 and 5. In addition, for each application, design level technology debt of the application is determined. Based on the infrastructure level technology debt score for the application and the design level technology debt score, an overall health score for the application may be determined. The infrastructure level technology debt score and the design level technology debt score of the application may be combined, such as by adding the normalized scores, and then comparing the scores to thresholds indicative of levels of concern. The infrastructure level technology debt score of an application and the design level technology debt score may be combined using a variety of different algorithms in various embodiments.

The data flows depicted in FIG. 6 may be implemented by an application program, such as an embodiment of the application program 214 of FIG. 2. In the data flow of FIG. 6, technical debt attributes 605 of component 1, and strategic criticality attributes 610 of component 1 are employed to determine component 1 technology currency score 615. Similarly, for component 2, technical debt attributes 620 and strategic criticality attributes are employed to determine component 2 technology currency score 630. Component 1 and component 2 correspond to application 1, which correspondence may be stored in a data storage accessible to one or more computer processors executing an application program, and component 1 score 615 and component 2 score 630 are inputs to determine application 1 technology infrastructure level technology debt score 675.

In addition to application 1 infrastructure level technology debt score 675, inputs to an application 1 score 650 may include application 1 design level technology debt score 670. As discussed above, design level technology debt of an application may be a determination based on a lack of compliance with applicable enterprise architectural standards, and may be a normalized value based on estimated time and expense to correct out of compliance aspects of the design level of an application.

Component 3 technology currency score 635 and component 4 technology currency score 640 contribute to application 2 infrastructure level technology debt score 655, as application 2 corresponds to component 3 and component 4. Component 3 and component 4 technology currency scores are based on technology debt attributes and strategic criticality attributes of the respective components, which attributes are not shown. Application 2 design level technology debt score 680 has been determined. Based on application 2 infrastructure level technology debt score 655 and application 2 design level technology debt score 680, an application 2 score 655 is determined.

Business capability score 660 is based on the application 1 score 650 and application 2 score 655. As may be seen, the technology debt attributes and strategic criticality attributes of each component that ultimately corresponds to the business capability contribute to the business capability score, as does the design level technology debt score of each application that corresponds to the business capability.

Figure 7:
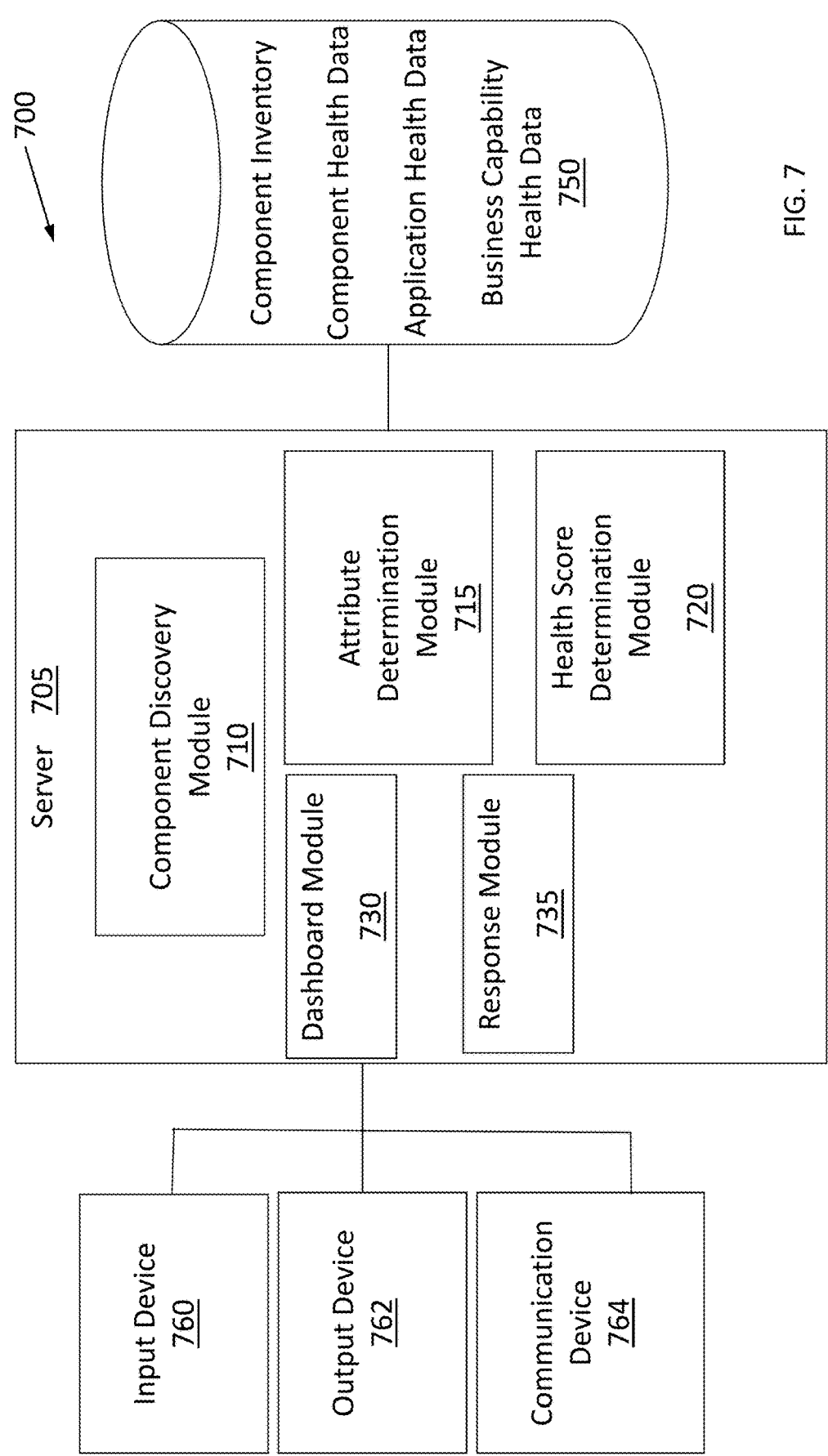
FIG. 7 shows an exemplary system of an illustrative embodiment of the present invention.

Referring to FIG. 7, a system 700 is illustrated that may implement the technology currency monitoring methods for a computer system described herein. Computer server 705 may include one or more computer processors executing computer-readable code stored in the form of modules in one more non-transitory storage devices. A component discovery module 710 may periodically scan a system to identify components that are deployed and update an inventory of components, which may be stored in data storage device 750 in communication with server 705. Attribute determination module 720 may determine scores for attributes of components identified in the component inventory. Health score determination module 720 may determine health scores or technology currency scores for components, applications and business capabilities based on scores of attributes of components, stored formulas for calculating scores and stored correspondences between components, applications and business capabilities. Health score determination module 720 may also determine design level technology debt of applications. In embodiments, the various functions of health score determination module may be performed by separate modules. Resulting scores may be stored in data storage 750 as component health data and application health data, which may include design level technology debt data, as well as business capability health data. Response module 735 may include instructions for providing one or more automatic responses to detection of components having a health score falling below a threshold. The automatic response may include such responses as automatic notification of an account of the component and the fact that the health score has fallen below a threshold, automatic updating of the component, and enhanced monitoring of the component. The enhanced monitoring may include monitoring or testing at shorter intervals than a default monitoring or testing interval, and may include additional tests or monitoring operations than default tests or monitoring operations.

Dashboard module 730 may provide interactive displays and access to graphic and textual representations of health data stored in data storage 750 to user devices connected via a network (not shown) via communication device 764, which may be may be, for example, a communications port, a wired transceiver, a wireless transceiver, and/or a network card, or may interact with users via input devices 760 and output devices 762. Input devices 760 may include input devices such as a keyboard, a mouse, a trackball, a touch screen, a touch pad, a stylus pad, and/or other device. Output devices 762 may include printers, monitors or television display, a plasma display, a liquid crystal display (LCD), and/or a display based on a technology such as front or rear projection, light emitting diodes (LEDs), organic light-emitting diodes (OLEDs), or Digital Light Processing (DLP).

Each or any combination of the modules shown in FIG. 7 may be implemented as one or more software modules or objects, one or more specific-purpose processor elements, or as combinations thereof. Suitable software modules include, by way of example, an executable program, a function, a method call, a procedure, a routine or sub-routine, one or more processor-executable instructions, an object, or a data structure. In addition or as an alternative to the features of these modules described with reference to FIG. 7, these modules may perform functionality described elsewhere herein.

Referring to FIG. 8, an exemplary process flow of determination of design level debt of an application will be explained. The process may be performed by one or more processors executing instructions stored in one or more computer readable media. The processors and instructions may be embodied in a system server, such as exemplary server 120 of FIG. 1 or exemplary server 705 of FIG. 7, or in central processing unit 210 and applications 214 of FIG. 2.

The process determines compliance of an application architecture with current enterprise architectural standards, and in particular, in an embodiment, with current enterprise architectural standards with respect to certain architectural standards. The steps of assessment for compliance with architectural standards using a neural network or artificial intelligence application that has been trained on training set data in the form of various application architectures, standards, and corresponding scoring of assessment of the application architectures based on the standards.

The application architecture is assessed for compliance with a simplification standard 805, employing, for example, suitably trained neural networks or an artificial intelligence application. Simplification in software architecture may refer to including a lower number of features in a software architecture than would be required to perform the requirements of the function. An architecture that lacks simplicity and hence would have a relatively low score on this standard would include a relatively large number of features.

The application architecture is assessed for compliance with a modernization architectural standard 810, employing, for example, suitably trained neural networks or an artificial intelligence application. Modernization may refer to the use of current architecture, in contrast to the use of legacy tools or older software. Software that is built using tools and platforms that are expected to have a long life may have a higher score on the modernization factor than software built using tools that are older or are expected to have a relatively short life.

The architectural design is assessed 815 for compliance with the standard and architectural decision alignment, employing, for example, suitably trained neural networks or an artificial intelligence application. Standard and architecture decision alignment may be a determination that architectural decisions of the application, as documented in an architectural decision document, are aligned with the enterprise architectural standards. If architectural decisions as reflected in architectural decision documents for the application are generally the same as the enterprise architectural standards, the application will have a relatively high score on this standard, as compared to an application in which architectural decisions as reflect in architectural decision documents differ from the enterprise architectural standard.

The architectural design is assessed 820 for compliance with a pattern alignment standard, employing, for example, suitably trained neural networks or an artificial intelligence application. Pattern alignment refers to the alignment between architectural solutions to be applied to problems commonly encountered in software architecture as specified in architectural standards, and the solutions employed in the application. If review of architectural solutions employed in the application architecture shows that the employed architectural solutions are generally the same as or similar to the solutions specified in the architectural standards, then the application will have a high score on this standard, as compared to an application in which the review of architectural solutions employed in the application architecture shows that the employed architectural solutions are generally significantly different from the solutions specified in the architectural standards.

The architectural design is assessed 825 for compliance with a software documentation completeness standard, employing, for example, suitably trained neural networks or an artificial intelligence application. Software architecture documentation completeness refers to the comprehensive nature of the documentation for the architecture of the application. If the software architecture documentation describes all features of the software architecture, a relatively high score will be received. If the assessment shows that architectural features are either not described in the architectural documentation or incompletely or inaccurately described, then a relatively low score will be received.

In embodiments, additional or fewer standards may be employed in the assessment of the application design for compliance with standards.

Based on the results of assessment of the architectural design of the application with respect to the standards, a list of discrepancies to be corrected in order to increase the score to a minimum acceptable level is generated by the system. In addition to or as an alternative of a listing of discrepancies, a list of actions to be taken to correct each of the discrepancies or otherwise to place the design in better compliance is generated. The system may include, by way of example, a database mapping discrepancies to lists of actions, for use in generating a list. In embodiments, suitably trained neural networks or an artificial intelligence application may be employed, using training data such as discrepancies identified in prior reviews of architectures and resulting actions.

Based on the list of actions to be taken, a time to correct the discrepancies is determined 830. The system may have access to a database indicating such information as typical number of developer hours for actions, whether actions can be taken in parallel and or must be in sequence, in order to generate an estimated time to correct the discrepancies. In embodiments, suitably trained neural networks or an artificial intelligence application may be employed, using training data such as records of numbers of developer hours to take actions in prior projects, overall time frames for actions, and data relating to whether certain actions may be taken simultaneously or in parallel.

Based on the list of actions to be taken and in some embodiments based on determined time for correction, including such data as number of developer hours determined in step 830, a cost to correct the discrepancies is determined 840. In embodiments, the cost may be determined based on a database indicating cost to take listed actions. In embodiments, suitably trained neural networks or an artificial intelligence application may be employed, using training data such as records of costs to take identified actions, or to correct discrepancies, in prior projects.

The determined time and cost are then normalized 850. The determined time may be normalized on a suitable scale, such as a scale that maps various time ranges to integral numbers on a scale. On such a scale, for a lower value indicating lower design level debt, a shorter time frame may map to a higher number. For example, on a scale of 1 to 10, where 1 indicates a minimum technology design level technology debt and 10 a maximum design level technology debt, a time to correct of less than one month may map to a value of 1, and a time to correct of 18 months or more may map to a value of 10, with intermediate time ranges mapping to integers 2 to 9. The determined cost may be normalized on a suitable scale that maps certain ranges of dollar values to integral numbers on a scale. For a scale of 1 to 10, where 1 indicates a minimum technology design level technology debt and 10 a maximum design level technology debt, a cost no more than a minimum value may map to a value of 1, and a cost of more than a maximum value may map to a value of 10, with intermediate cost ranges mapping to integers 2 to 9.

The determined and normalized time and cost to correct the discrepancies from each standard may then be combined to determine 860 a design level debt, such as on a suitable scale. By way of example, the normalized time to correct discrepancies and normalized cost to correct discrepancies may be added together, with both time and cost contributing equally, to provide a scaled design level technology debt. The combination may take other forms, such as averaging, or weighting normalized time and normalized cost differently.

Based on the determination of design level technology debt of application architecture, the upgrading and maintenance of computer systems is made more efficient, and errors in data processing may be reduced. The systematic and accurate determination of design level technology debt permits selection and upgrading of applications that result in more efficient and accurate computing processes, thereby resulting in efficiencies in system resources, such as memory and processor resources.

Referring now to FIG. 9, there is shown user device 900, in the form of a laptop computer, having a display 910 generated by a suitable dashboard application pulling component data from one or more databases. By way of example, laptop computer 125 of FIG. 1 may provide such a display based on a local or network dashboard application accessing data stored on the network and generated based on calculations performed by technology currency tool 150 running on computer server 120. By way of further example, laptop computer 206 of FIG. 2 may provide such a display based on a local or network dashboard application pulling data stored in databases 224. The exemplary dashboard application display 910 shows, for each of four different time periods, identified in this example as weeks, numbers of components in a computer system that have been assessed for technology debt as acceptable, concerning and critical. The system has thousands of components, and thus embodiments of the present invention enable practical frequency assessment of the technology debt of the components. The display shows progress over time as components are updated or replaced so that fewer components are in the critical and concerning ranges and more components are in the acceptable range. Dashboard views allow users to accurately allocate resources to components in critical and concerning condition so as to improve computer system performance and reduce the incidence of errors and unavailability of resources.

Although the methods and features described above with reference to FIGS. 1-9 are described above as performed using the example architecture 100 of FIG. 1, the exemplary system 200 of FIG. 2 and the exemplary system 700 of FIG. 7, the methods and features described above may be performed using any appropriate architecture and/or computing environment. Although features and elements are described above in particular combinations, each feature or element can be used alone or in any combination with or without the other features and elements. For example, each feature or element as described with reference to FIGS. 1-9 may be used alone without the other features and elements or in various combinations with or without other features and elements. Sub-elements of the methods and features described above with reference to FIGS. 1-9 may be performed in any arbitrary order (including concurrently), in any combination or sub-combination.

What is claimed is:

1. A computer system for technology currency assessment of components and applications of one or more computer systems, comprising:

one or more computer processors;

one or more non-transitory computer memories, the computer memories storing computer-readable instructions, which instructions, when executed by the one or more computer processors, cause the one or more computer processors to:

employing a discovery tool, identify components of the computer system and update an inventory of the components for the computer system;

automatically monitor the components in the inventory;

receive data indicative of a value for each of a plurality of technology debt attributes, comprising at least (1) supportability, (2) expected remaining life span, (3) stability, wherein stability is a measure of an ability of a component to maintain normal processing over time periods and under a variety of different demands and (4) span, wherein span is a measure of an extent to which a component is implemented within an entity computer system and at least one strategic criticality attribute comprising at least business criticality, wherein a component performing essential functions to real-time processing has a higher business criticality score than a component not performing essential functions to real-time processing, for each of the components;

responsive to receipt of the values, calculate a technology currency score for each of the components based on (1) a sum of the values of each of the plurality of technology debt attributes, and (2) a sum of the values of the at least one strategic criticality attribute;

transmit the calculated technology currency score for each of the components to one or more user devices, wherein the one or more user devices are configured to provide a dashboard application display showing, for each of a plurality of different time periods, numbers of components in a computer system that have calculated technology currency scores in each of a plurality of ranges;

responsive to a determination that the technology currency score for one of the components is beyond a first threshold, perform monitoring of the component more frequently than a standard or default frequency;

responsive to a determination that the technology currency score for one of the components is at least one of below a second threshold value or exhibiting a negative trend over time, automatically trigger a deployment pipeline to replace the component or application with an updated version of the same component or application or to replace the component or application with a component or application having equivalent functionality.

2. The computer system of claim 1, wherein the instructions further cause the one or more processors to, for each of the plurality of applications of the system, determine, based on the calculated technology currency scores for each of the components associated with the application, a technology currency score for the application.

3. The computer system of claim 2, wherein the instructions further cause the one or more processors to determine a design level technology debt for the application, and to further determine an overall score for the application based on the technology currency score based and the design level technology debt score.

4. The computer system of claim 1, wherein the at least one strategic criticality attribute further comprises alignment with strategic technology roadmap.

5. A computer-implemented method for performing technology currency monitoring of a plurality of components of a computer system, comprising:

employing a discovery tool, identifying, by one or more computer processors, components of the computer system and updating an inventory of the components for the computer system;

automatically monitoring, by one or more computer processors, the components in the inventory;

receiving, by one or more computer processors, data indicative of a value for each of a plurality of technology debt attributes, comprising at least (1) supportability, (2) expected remaining life span, (3) stability, wherein stability is a measure of an ability of a component to maintain normal processing over time periods and under a variety of different demands and (4) span, wherein span is a measure of an extent to which a component is implemented within an entity computer system and at least one strategic criticality attribute comprising at least business criticality, wherein a component performing essential functions to real-time processing has a higher business criticality score than a component not performing essential functions to real-time processing, for each of the components;

responsive to receipt of the values, calculating, by one or more computer processors, a technology currency score for each of the components based on (1) a sum of the values of each of the plurality of technology debt attributes, and (2) a sum of the values of the at least one strategic criticality attribute;

transmitting, by one or more computer processors, the calculated technology currency score for each of the components to one or more user devices, wherein the one or more user devices are configured to provide a dashboard application display showing, for each of a plurality of different time periods, numbers of components in a computer system that have calculated technology currency scores in each of a plurality of ranges;

responsive to a determination that the technology currency score for one of the components is beyond a first threshold, performing, by one or more computer processors, monitoring of the component more frequently than a standard or default frequency;

responsive to a determination that the technology currency score for one of the components is at least one of below a second threshold value or exhibiting a negative trend over time, automatically triggering, by one or more computer processors, a deployment pipeline to replace the component or application with an updated version of the same component or application or to replace the component or application with a component or application having equivalent functionality.

6. The computer-implemented method of claim 5, further comprising, for each of a plurality of applications of the system, each of the plurality of applications corresponding to a plurality of the components, determining, based on the calculated technology currency scores for each of the components corresponding to the application, a technology currency score for the application.

7. The computer-implemented method of claim 6, further comprising determining a design level technology debt for the application, and further determining the technology currency score based on the design level technology debt score.

8. The computer-implemented method of claim 5, wherein the calculating, by one or more computer processors, of the technology currency score for each of the components comprises multiplying the sum of the values of each of the plurality of technology debt attributes by the sum of the values of the at least one strategic criticality attribute.

9. A non-transitory computer-readable storage medium, storing computer-readable instructions, which instructions, when executed by the one or more computer processors, cause the one or more computer processors to:

employing a discovery tool, identify components of the computer system and update an inventory of the components for the computer system;

automatically monitor the components in the inventory;

receive data indicative of a value for each of a plurality of technology debt attributes, comprising at least (1) supportability, (2) expected remaining life span, (3) stability, wherein stability is a measure of an ability of a component to maintain normal processing over time periods and under a variety of different demands and (4) span, wherein span is a measure of an extent to which a component is implemented within an entity computer system, and at least one strategic criticality attribute comprising at least business criticality, wherein a component performing essential functions to real-time processing has a higher business criticality score than a component not performing essential functions to real-time processing, for each of the components;

responsive to receipt of the values, calculate a technology currency score for each of the components based on (1) a sum of the values of each of the plurality of technology debt attributes, and (2) a sum of the values of the at least one strategic criticality attribute;

transmit the calculated technology currency score for each of the components to one or more user devices wherein the one or more user devices are configured to provide a dashboard application display showing, for each of a plurality of different time periods, numbers of components in a computer system that have calculated technology currency scores in each of a plurality of ranges;

responsive to a determination that the technology currency score for one of the components is beyond a first threshold, perform monitoring of the component more frequently than a standard or default frequency;

responsive to a determination that the technology currency score for one of the components is at least one of below a second threshold value or exhibiting a negative trend over time, automatically trigger a deployment pipeline to replace the component or application with an updated version of the same component or application or to replace the component or application with a component or application having equivalent functionality.

10. The non-transitory computer-readable storage medium of claim 9, wherein the instructions further cause the one or more processors to, for each of the plurality of applications of the system, determine, based on the calculated technology currency scores for each of the components associated with the application, a technology currency score for the application.

11. The non-transitory computer-readable storage medium of claim 10, wherein the instructions further cause the one or more processors to, for at least some of the applications of the system, determine a design level technology debt for the application, wherein the design level technology debt is based on assessment of application architecture with respect to a plurality of architectural standards, including: a simplification standard; a modernization standard; a standard and architecture decision alignment standard; a pattern alignment standard; and a software architecture documentation completeness standard.

12. The non-transitory computer-readable storage medium of claim 11, wherein the instructions further cause the one or more processors to determine a cost and a time to correct discrepancies identified between the application architecture and each of the plurality of architectural standards.

13. The non-transitory computer-readable storage medium of claim 9, wherein the at least one strategic criticality attribute further comprises alignment with a strategic technology roadmap.

\* \* \* \* \*